US009682279B2

(12) United States Patent
Gordon et al.

(10) Patent No.: US 9,682,279 B2
(45) Date of Patent: *Jun. 20, 2017

(54) EXERCISE DEVICE PROVIDING USER DEFINED PEDAL MOVEMENTS

(71) Applicant: EXERCITING, LLC, Marietta, GA (US)

(72) Inventors: Joel D. Gordon, Owings Mills, MD (US); Kevin G. Abelbeck, Fort Collins, CO (US); Glenn D. Ross, Cameron Creek, GA (US)

(73) Assignee: Exerciting, LLC, Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,826

(22) Filed: Feb. 2, 2015

(65) Prior Publication Data
US 2015/0202489 A1 Jul. 23, 2015

Related U.S. Application Data

(60) Continuation of application No. 13/784,996, filed on Mar. 5, 2013, now Pat. No. 9,050,491, which is a
(Continued)

(51) Int. Cl.
*A63B 22/00* (2006.01)
*A63B 22/04* (2006.01)
(Continued)

(52) U.S. Cl.
CPC ........... *A63B 22/04* (2013.01); *A61H 1/0237* (2013.01); *A61H 1/0262* (2013.01);
(Continued)

(58) Field of Classification Search
CPC ............ A63B 22/0046; A63B 22/0048; A63B 22/0056; A63B 22/0664; A63B 2022/0051; A63B 2022/0676; A63B 2022/0682
(Continued)

(56) References Cited

U.S. PATENT DOCUMENTS 219,439 A 9/1879 Blend
3,316,898 A 5/1967 Brown
(Continued)

FOREIGN PATENT DOCUMENTS

CN 202682672 1/2013
DE 2919494 A1 11/1980
(Continued)

*Primary Examiner* — Stephen Crow
(74) *Attorney, Agent, or Firm* — Sherill Law Offices, PLLC

(57) ABSTRACT

An exercise device for performing a variety of movement patterns is provided, having an upper link pivotally mounted to a lower leg link and a foot support on a distal end of the lower leg link. A first transfer system is movably coupled to a frame and including a first transfer member coupled to the first upper leg link and a second transfer member coupled to the second upper leg link, thereby enabling substantially reciprocating motion of the first leg link relative to the second leg link. A second transfer system is also provided and may be movably coupled to the frame and including a pair of third transfer members coupled to each of a pair of fourth transfer members by way of each of a pair of transfer couplings, each movably mounted to the frame. The fourth transfer members may be coupled to the first lower leg link and the second lower leg link, whereby movement of the first lower leg link causes movement of the second lower leg link irrespective of movement of the upper leg links thereby
(Continued)

providing a stable platform for the user and also enabling an infinite number of gait patters by the user.

10 Claims, 22 Drawing Sheets

Related U.S. Application Data continuation of application No. 13/342,135, filed on Jan. 2, 2012, now Pat. No. 8,409,058, which is a division of application No. 12/911,970, filed on Oct. 26, 2010, now Pat. No. 8,109,861, which is a continuation-in-part of application No. 12/591,672, filed on Nov. 27, 2009, now Pat. No. 7,833,134, which is a division of application No. 11/501,780, filed on Aug. 10, 2006, now Pat. No. 7,645,215.

(60) Provisional application No. 61/331,520, filed on May 5, 2010.

(51) Int. Cl.
| | | |
|---|---|---|
| *A61H 1/02* | (2006.01) | |
| *A63B 21/00* | (2006.01) | |
| *A63B 22/02* | (2006.01) | |
| *A63B 22/06* | (2006.01) | |
| *B62M 1/24* | (2013.01) | |
| *B62M 1/30* | (2013.01) | |
| *A63B 21/008* | (2006.01) | |
| *A63B 21/22* | (2006.01) | |
| *A63B 22/20* | (2006.01) | |
| *A63B 69/00* | (2006.01) | |

(52) U.S. Cl.
CPC ...... *A63B 21/00178* (2013.01); *A63B 21/155* (2013.01); *A63B 22/001* (2013.01); *A63B 22/0017* (2015.10); *A63B 22/0056* (2013.01); *A63B 22/02* (2013.01); *A63B 22/0292* (2015.10); *A63B 22/0664* (2013.01); *B62M 1/24* (2013.01); *B62M 1/30* (2013.01); *A63B 21/0083* (2013.01); *A63B 21/225* (2013.01); *A63B 22/0046* (2013.01); *A63B 22/20* (2013.01); *A63B 22/203* (2013.01); *A63B 22/208* (2013.01); *A63B 69/0064* (2013.01); *A63B 2022/0051* (2013.01); *A63B 2022/0682* (2013.01); *A63B 2022/0688* (2013.01); *A63B 2220/56* (2013.01); *A63B 2230/015* (2013.01)

(58) Field of Classification Search
USPC ..................................................... 482/51–65
See application file for complete search history.

(56) References Cited

U.S. PATENT DOCUMENTS

| | | |
|---|---|---|
| 3,316,899 A | 5/1967 | Raeder |
| 3,970,302 A | 7/1976 | McFee |
| 3,995,491 A | 12/1976 | Wolfla, II |
| 4,023,795 A | 5/1977 | Pauls |
| 4,053,173 A | 10/1977 | Chase, Sr. |
| 4,185,622 A | 1/1980 | Swenson |
| 4,188,030 A | 2/1980 | Hooper |
| 4,379,566 A | 4/1983 | Titcomb |
| 4,456,276 A | 6/1984 | Bortolin |
| 4,456,279 A | 6/1984 | Dirck |
| 4,470,597 A | 9/1984 | McFee |
| 4,496,147 A | 1/1985 | DeCloux et al. |
| 4,509,742 A | 4/1985 | Cones |
| 4,555,109 A | 11/1985 | Hartmann |
| 4,561,318 A | 12/1985 | Schirrmacher |
| 4,679,786 A | 7/1987 | Rodgers |
| 4,685,666 A | 8/1987 | DeCloux |
| 4,708,338 A | 11/1987 | Potts |
| 4,709,918 A | 12/1987 | Grinblat |
| 4,720,093 A | 1/1988 | Del Mar |
| 4,733,858 A | 3/1988 | Lan |
| 4,779,863 A | 10/1988 | Yang |
| 4,786,050 A | 11/1988 | Geschwender |
| 4,838,543 A | 6/1989 | Armstrong et al. |
| 4,850,585 A | 7/1989 | Dalebout |
| 4,869,494 A | 9/1989 | Lambert, Sr. |
| 4,900,013 A | 2/1990 | Rodgers, Jr. |
| 4,940,233 A | 7/1990 | Bull et al. |
| 4,949,954 A | 8/1990 | Hix |
| 4,949,993 A | 8/1990 | Stark et al. |
| 4,951,942 A | 8/1990 | Walden |
| 4,989,857 A | 2/1991 | Kuo |
| 5,000,442 A | 3/1991 | Dalebout et al. |
| 5,000,443 A | 3/1991 | Dalebout et al. |
| 5,038,758 A | 8/1991 | Iams et al. |
| 5,039,087 A | 8/1991 | Kuo |
| 5,039,088 A | 8/1991 | Shifferaw |
| 5,040,786 A | 8/1991 | Jou |
| 5,048,821 A | 9/1991 | Kuo-Liang |
| 5,062,627 A | 11/1991 | Bingham |
| 5,072,928 A | 12/1991 | Stearns et al. |
| 5,129,872 A | 7/1992 | Dalton et al. |
| 5,131,895 A | 7/1992 | Rogers, Jr. |
| 5,135,447 A | 8/1992 | Robards, Jr. et al. |
| 5,149,312 A | 9/1992 | Croft et al. |
| 5,186,697 A | 2/1993 | Rennex |
| 5,195,935 A | 3/1993 | Fencel |
| 5,242,343 A | 9/1993 | Miller |
| 5,279,529 A | 1/1994 | Eschenbach |
| 5,279,530 A | 1/1994 | Hess |
| 5,290,211 A | 3/1994 | Stearns |
| 5,295,928 A | 3/1994 | Rennex |
| 5,299,993 A | 4/1994 | Habing |
| 5,336,141 A | 8/1994 | Vittone |
| 5,352,169 A | 10/1994 | Eschenbach |
| 5,383,829 A | 1/1995 | Miller |
| 5,401,226 A | 3/1995 | Stearns |
| 5,419,747 A | 5/1995 | Piaget et al. |
| 5,423,729 A | 6/1995 | Eschenbach |
| 5,496,235 A | 3/1996 | Stevens |
| 5,499,956 A | 3/1996 | Habing et al. |
| 5,518,473 A | 5/1996 | Miller |
| 5,527,246 A | 6/1996 | Rodgers, Jr. |
| 5,529,554 A | 6/1996 | Eschenbach |
| 5,529,555 A | 6/1996 | Rodgers, Jr. |
| 5,538,486 A | 7/1996 | France et al. |
| 5,540,637 A | 7/1996 | Rodgers, Jr. |
| 5,549,526 A | 8/1996 | Rodgers, Jr. |
| 5,573,480 A | 11/1996 | Rodgers, Jr. |
| 5,577,985 A | 11/1996 | Miller |
| 5,584,780 A | 12/1996 | Lin |
| 5,593,371 A | 1/1997 | Rodgers, Jr. |
| 5,593,372 A | 1/1997 | Rodgers, Jr. |
| 5,595,553 A | 1/1997 | Rodgers, Jr. |
| 5,611,756 A | 3/1997 | Miller |
| 5,637,058 A | 6/1997 | Rodgers, Jr. |
| 5,735,773 A | 4/1998 | Vittone et al. |
| 5,746,681 A | 5/1998 | Bull |
| 5,769,760 A | 6/1998 | Lin et al. |
| 5,788,610 A | 8/1998 | Eschenbach |
| 5,792,026 A | 8/1998 | Maresh et al. |
| 5,792,027 A | 8/1998 | Gvoich |
| 5,792,028 A | 8/1998 | Jarvie |
| 5,792,029 A | 8/1998 | Gordon |
| 5,813,949 A | 9/1998 | Rodgers, Jr. |
| 5,857,940 A | 1/1999 | Husted |
| 5,876,308 A | 3/1999 | Jarvie |
| 5,910,072 A | 6/1999 | Rawls et al. |
| 5,911,649 A | 6/1999 | Miller |
| 5,967,944 A | 10/1999 | Vittone et al. |
| 6,004,244 A | 12/1999 | Simonson |
| 6,036,622 A | 3/2000 | Gordon |
| 6,045,487 A | 4/2000 | Miller |
| 6,152,859 A | 11/2000 | Stearns |

(56) References Cited

U.S. PATENT DOCUMENTS

| | | | |
|---|---|---|---|
| 6,183,397 B1 | 2/2001 | Stearns et al. | |
| 6,368,252 B1 | 4/2002 | Stearns | |
| 6,390,953 B1 | 5/2002 | Maresh et al. | |
| D476,046 S | 6/2003 | Wang et al. | |
| 7,201,704 B2 | 4/2007 | Stearns | |
| 7,226,390 B2 | 6/2007 | Stearns | |
| 7,285,075 B2 | 10/2007 | Cutler et al. | |
| D555,743 S | 11/2007 | Wang | |
| 7,520,839 B2 | 4/2009 | Rodgers, Jr. | |
| 7,530,926 B2 | 5/2009 | Rodgers, Jr. | |
| 7,608,018 B2 | 10/2009 | Chuang et al. | |
| 7,645,215 B2 * | 1/2010 | Gordon | A63B 22/0017 482/51 |
| 7,708,669 B2 | 5/2010 | Rodgers, Jr. | |
| 7,828,698 B2 | 11/2010 | Rodgers, Jr. | |
| 7,833,134 B2 * | 11/2010 | Gordon | A63B 22/0017 482/51 |
| 7,862,482 B1 | 1/2011 | Hsu | |
| D640,337 S | 6/2011 | Liu | |
| 8,082,029 B2 | 12/2011 | Honda | |
| 8,109,861 B2 * | 2/2012 | Gordon | A61H 1/0237 482/51 |
| 8,409,058 B2 * | 4/2013 | Gordon | A61H 1/0237 482/51 |
| D703,278 S | 4/2014 | Horita | |
| 9,050,491 B2 * | 6/2015 | Gordon | A61H 1/0237 |
| 2002/0049121 A1 | 4/2002 | Anderson et al. | |
| 2003/0092532 A1 | 5/2003 | Giannelli et al. | |
| 2004/0224825 A1 | 11/2004 | Giannelli et al. | |
| 2005/0054488 A1 | 3/2005 | Husted et al. | |
| 2005/0124467 A1 * | 6/2005 | Rodgers, Jr. | 482/52 |
| 2006/0189454 A1 | 8/2006 | Bull | |
| 2007/0037667 A1 | 2/2007 | Gordon | |
| 2008/0132385 A1 | 6/2008 | Alessandri et al. | |
| 2008/0287265 A1 | 11/2008 | Giannelli et al. | |
| 2009/0203501 A1 | 8/2009 | Rodgers, Jr. | |
| 2010/0093498 A1 | 4/2010 | Fenster et al. | |
| 2010/0160115 A1 | 6/2010 | Morris et al. | |
| 2010/0267524 A1 | 10/2010 | Stewart et al. | |
| 2011/0028275 A1 | 2/2011 | Stewart et al. | |
| 2014/0148311 A1 | 5/2014 | Eschenbach | |

FOREIGN PATENT DOCUMENTS

| | | |
|---|---|---|
| DE | 10060466 A1 | 6/2002 |
| EP | 2000178 A1 | 12/2008 |
| TW | M378001 | 4/2010 |
| WO | 2008124025 A1 | 10/2008 |

\* cited by examiner

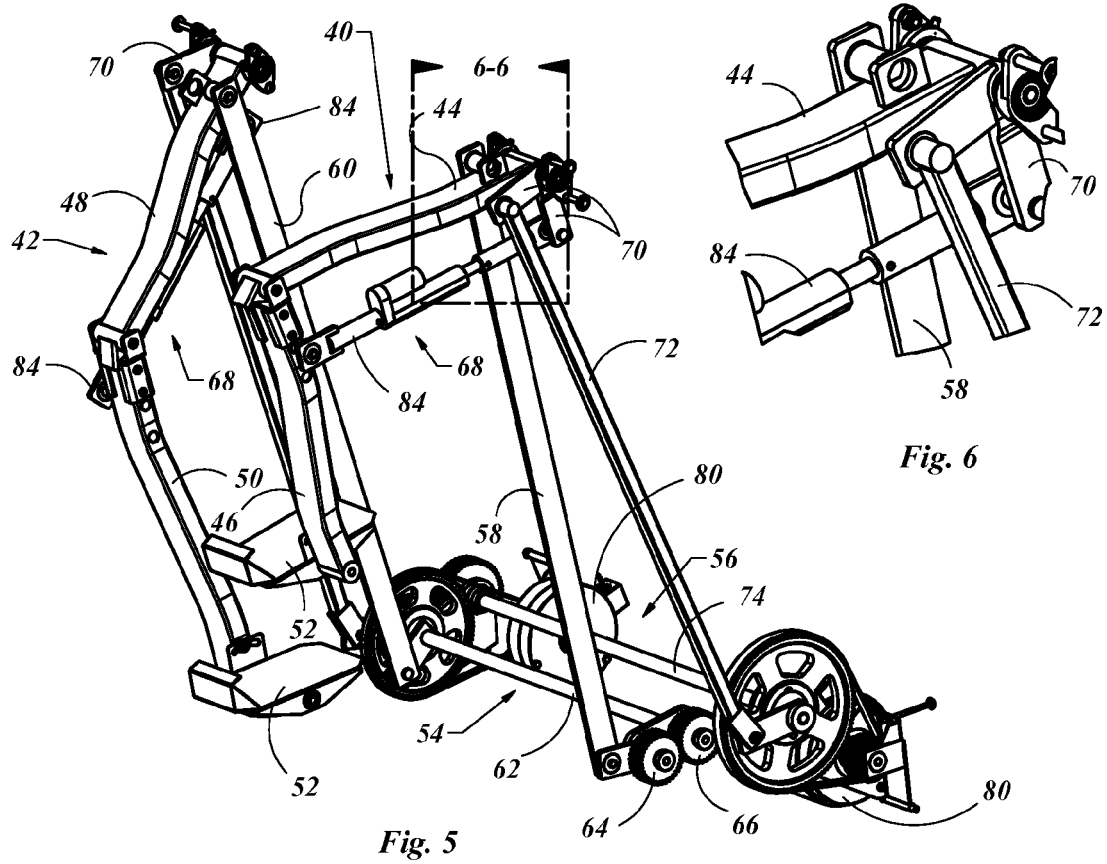

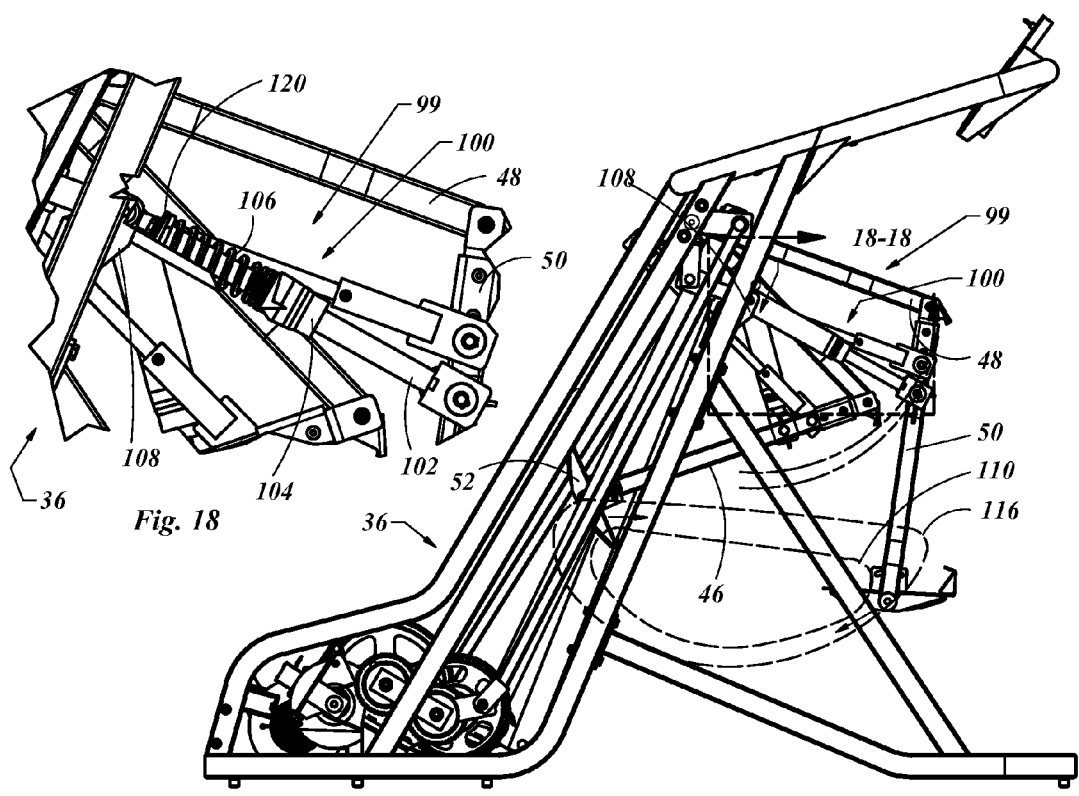

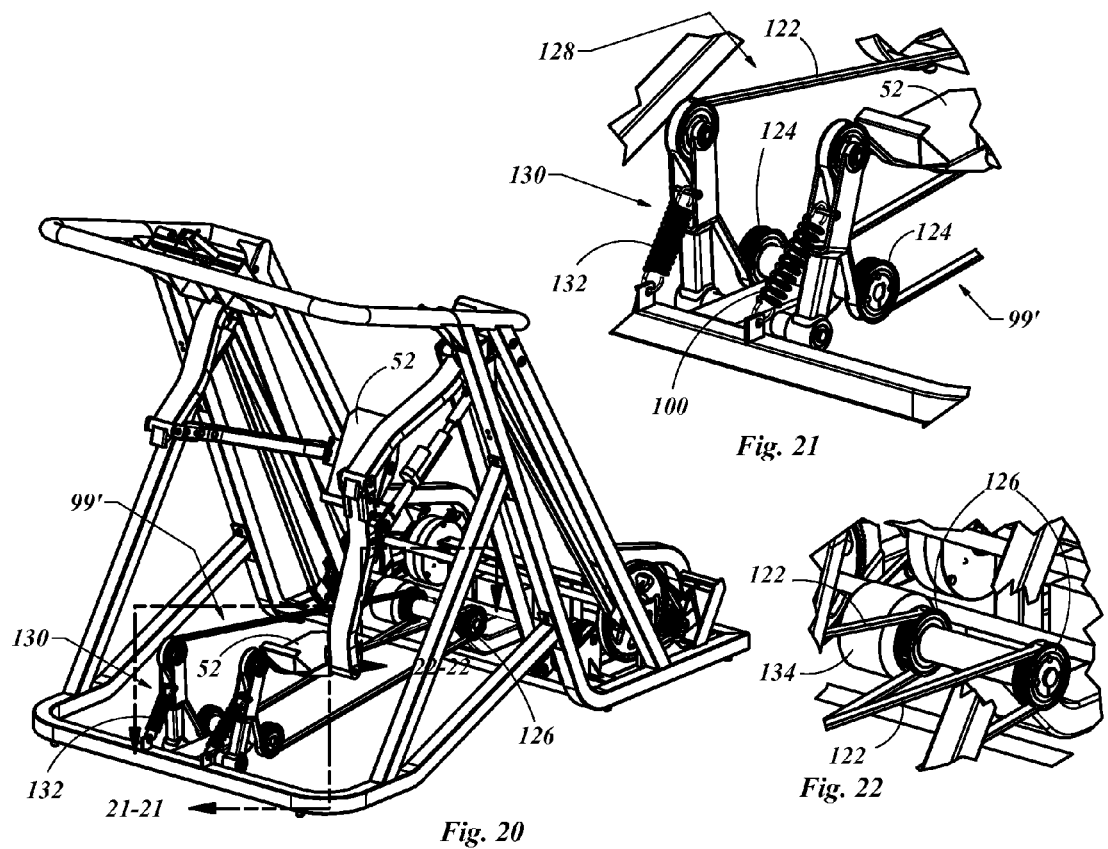

EXERCISE DEVICE PROVIDING USER DEFINED PEDAL MOVEMENTS

FIELD OF THE INVENTION

The present invention generally relates to exercise equipment and more particularly, to exercise equipment which simulate or facilitate ambulatory human movement.

BACKGROUND OF THE INVENTION

Exercise is a necessary part of a healthy lifestyle. Without proper exercise, muscle tissue decreases, the mineral density of bones decline and people tend toward storing more fat weight. This contributes to a variety of health issues including cardiovascular disease, osteoporosis and diabetes. A common aerobic exercise is running. The ground pounding action of running can cause joint issues in some people. In addition, running outdoors requires a suitable space and environment. Weather and personal safety restrict some individuals from performing this activity as often as they would like, as running in bad weather or a bad neighborhood can result in more serious problems than heart disease.

Indoor running and walking can be accomplished by use of a treadmill, but again, the pounding action of the foot on the tread may lead to joint overuse injuries. Other products such as elliptical trainers address this problem but restrict the user to a set gait pattern. Any slight variation between the user's natural gait and the machine's predetermined gait may cause an imbalance in joint loading, as well as muscular development of the limbs being used. Given that people have different stride lengths and they vary greatly in height and weight, it is unlikely that a single predefined gait would be ideal for all users.

It should, therefore, be appreciated that there is a need for a fitness device that enables movement in a variety of gait patterns with minimal transition effort from one pattern to another. The present invention fulfills this need and others.

SUMMARY OF THE INVENTION

The present invention provides a frame that supports a first upper leg link and a second upper leg link, each pivotally coupled to the frame. A first lower leg link may be pivotally coupled to the first upper leg link and a second lower leg link may be pivotally coupled to the second upper leg link, each lower leg link may include a foot support. A first transfer system may be provided which may be movably coupled to the frame and include a first transfer member coupled to the first upper leg link and a second transfer member coupled to the second upper leg link. A second transfer system may be provided which is movably coupled to the frame, and may include a pair of third transfer members, coupled to each of a pair of fourth transfer members by way of each of a pair of transfer couplings, each of which may be movably mounted to the frame. The fourth transfer members may be coupled to the first lower leg link and the second lower leg link, whereby movement of the first lower leg link may cause movement of the second lower leg link irrespective of movement of the upper leg links.

In one embodiment of the invention, the first transfer system may be comprised of a first gear and a second gear, whereby rotation of the first gear results in rotation in an opposite direction of the second gear. The first transfer system may also be comprised of a pivot bar with a first end and a second end and pivotally mounted to the frame. The first end may be coupled to the first transfer member and the second end may be coupled to the second transfer member.

The exercise device may also include a support system, defining a lowest position of the foot supports. The support system may be comprised of a compression link with a first end coupled to the frame and a second end coupled to a lower leg link. The compression link may be comprised of a housing, a rod received by the housing and a bias member captured between the housing and the rod, thereby limiting the amount of displacement of the rod relative to the housing. The support system may include a first compression link coupled to the first lower leg link and a second compression link coupled to the second lower leg link.

The support system may be comprised of one or more belts, each movably coupled to the frame by at least two pulleys. The belt may include an upper run positioned adjacent to a lower portion of the foot support and adapted for contact with the upper run, thereby the belt may limit the vertical displacement of the foot support. The support system may be comprised of a belt take-up coupled to the frame, the belt take-up may be biased to provide tension in the belt. The support system may also include a belt drive, such as a motor or other power device, operationally coupled to the belt to enable continuous rotation of one or more of the pulleys, thereby allowing continuous movement of the belt in the absence of power input from a user.

For purposes of summarizing the invention and the advantages achieved over the prior art, certain advantages of the invention have been described herein above. Of course, it is to be understood that not necessarily all such advantages can be achieved in accordance with any particular embodiment of the invention. Thus, for example, those skilled in the art will recognize that the invention can be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any particular embodiment(s) disclosed.

BRIEF DESCRIPTION OF THE DRAWINGS

Embodiments of the present invention will now be described, by way of example only, with reference to the following drawings, in which:

FIG. 5 is an isometric view of the linkage of FIG. 3 shown from the front, left.

FIG. 6 is an isometric view of a detail of the upper leg link pivot of the linkage shown in FIG. 5, the detail shown in FIG. 5 along line 6-6.

FIG. 17 is a side view of the device of FIG. 15 showing different pedal paths as may be guided by a compression link positioned in different positions relative to the frame, and the pedals in a relatively horizontal position.

FIG. 18 is a detail of the device of FIG. 17 shown along line 18-18, illustrating a compression link with a cover partially removed.

FIG. 20 is an isometric view of the device of FIG. 19 from a front, side orientation.

FIG. 21 is a detail of the device of FIG. 20 shown along line 21-21, illustrating front pulleys of a support system.

FIG. 22 is a detail of the device of FIG. 20 shown along line 22-22, illustrating rear pulleys of a support system.

DETAILED DESCRIPTION OF THE INVENTION

Figure 1:
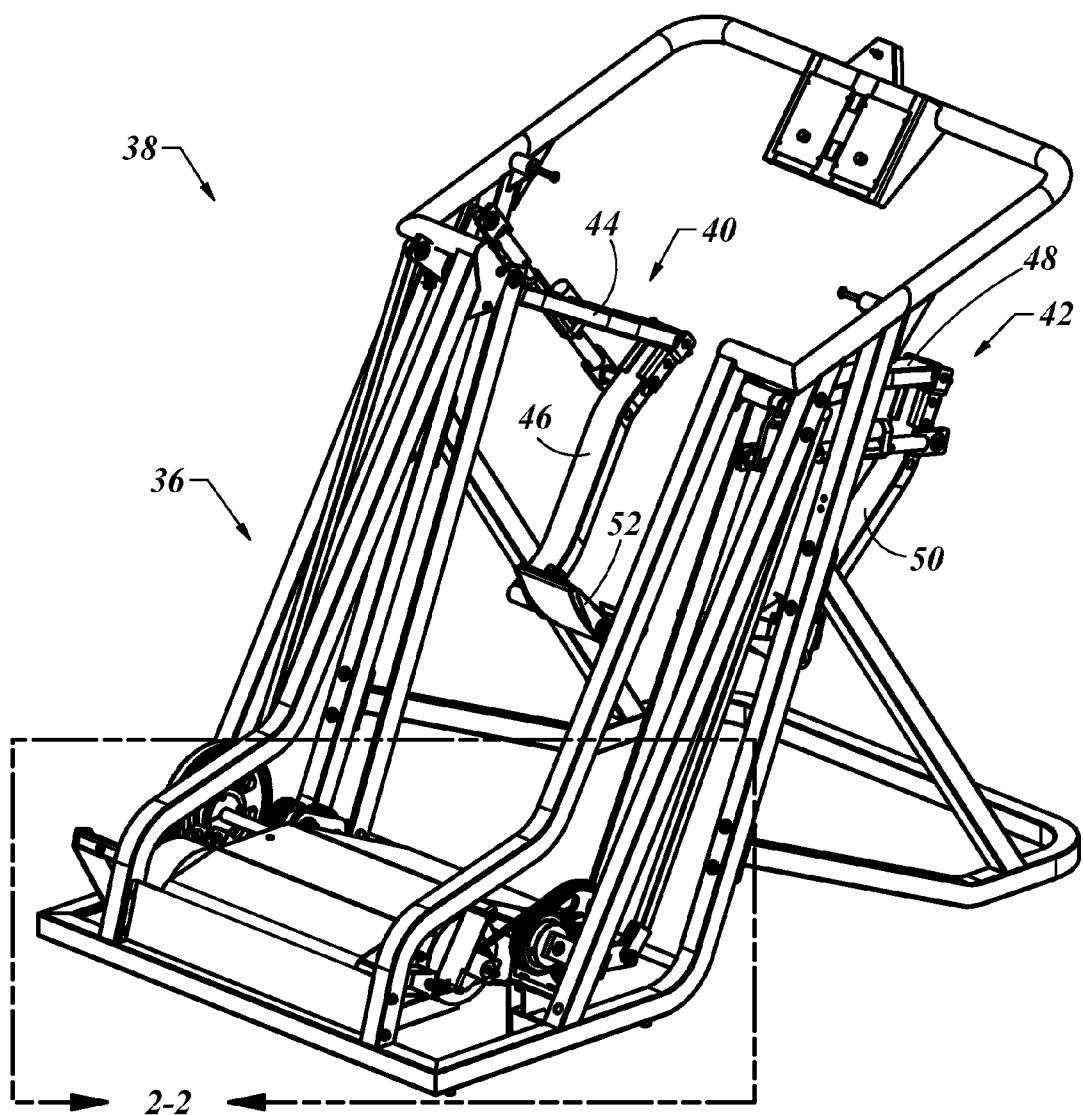
FIG. 1 is an isometric view of an exercise device incorporating a system enabling varied gait movements in accordance with the present invention.

With reference to the illustrative drawings, and particularly to FIGS. 1-6, there is shown an exercise device in the form of a multifunctional adaptive training device 38. This embodiment of the invention may include a frame 36 supporting a pair of leg linkages including a first leg linkage 40 and a second leg linkage 42. The first leg linkage 40 may include a first upper link 44 coupled to a first lower link 46. In a like manner, a second leg linkage 42 may include a second upper link 48 coupled to a second lower link 50. A foot support 52 may be positioned on a distal end of each of the first lower link 46 and the second lower link 50. A user may position themselves with one foot on each of the foot supports 52 and perform a variety of different exercises.

The foot supports 52 are linked from one to the other by way of a first transfer system 54 and a second transfer system 56. The first transfer system 54 may include a first transfer member 58, coupled to the first upper link 44 and a second transfer member 60 coupled to the second upper link 48. The first transfer system 54 may also include a first transfer bar 62 enabling substantially opposing motion of the first transfer member 58 relative to the second transfer member 60. The substantially opposing motion may be achieved through a first gear 64 mounted adjacent to a second gear 66 and the first transfer member 58 being coupled to the first gear 64 and the second transfer member 60 being coupled to the second gear 66 by way of the first transfer bar 62. This combination may provide a substantially reciprocating motion of the first upper link 44 relative to the second upper link 48.

To complete the linking of the foot supports 52 of the first leg linkage 40 to that of the second leg linkage 42, the first lower link 46 may be linked to the second lower link 50. This may be done by coupling a pair of third transfer members 68, one each to the first lower link 46 and one to the second lower link 50. A pair of transfer couplings 70 may be supported on the frame 36 and coupling each of the pair of third transfer members 68 to each of a pair of fourth transfer members 72. The fourth transfer members 72 are coupled one to the other by way of the second transfer system 56, thereby enabling substantially reciprocating motion of the fourth transfer members, one to the other. A second transfer bar 74 may be used to transmit torque from one of the fourth transfer members 72 to the other.

As with the first transfer system 54, the second transfer system 56 may include a third gear 76 coupled to the second transfer bar 74 and a fourth gear 78, adjacent to the third gear 76. The fourth gear 78 may be coupled to one of the fourth transfer members 72 and the second transfer bar 74 coupled to the other fourth transfer member 72, thereby enabling substantially reciprocating motion of the fourth transfer members 72, relative to the other. This action could provide substantially opposite movement of the third transfer members 68 one to the other, which may provide substantially opposite movement of the first lower link 46 relative to the second lower link 50. With both the first transfer system 54 and the second transfer system 56 the movement of one foot support 52 to the other may be controlled. Each foot support 52 may be placed in an infinite number of positions within its plane of movement. In doing so, the other foot support 52 will be placed in a specific position in space within its plane of movement. This combination enables a path of motion of a foot support 52 that is not confined by the machine as it is infinitely variable by the user. The stability to the user is provided by the linked positioning of each foot support 52, thereby providing a stable platform to support the user.

Figure 2:
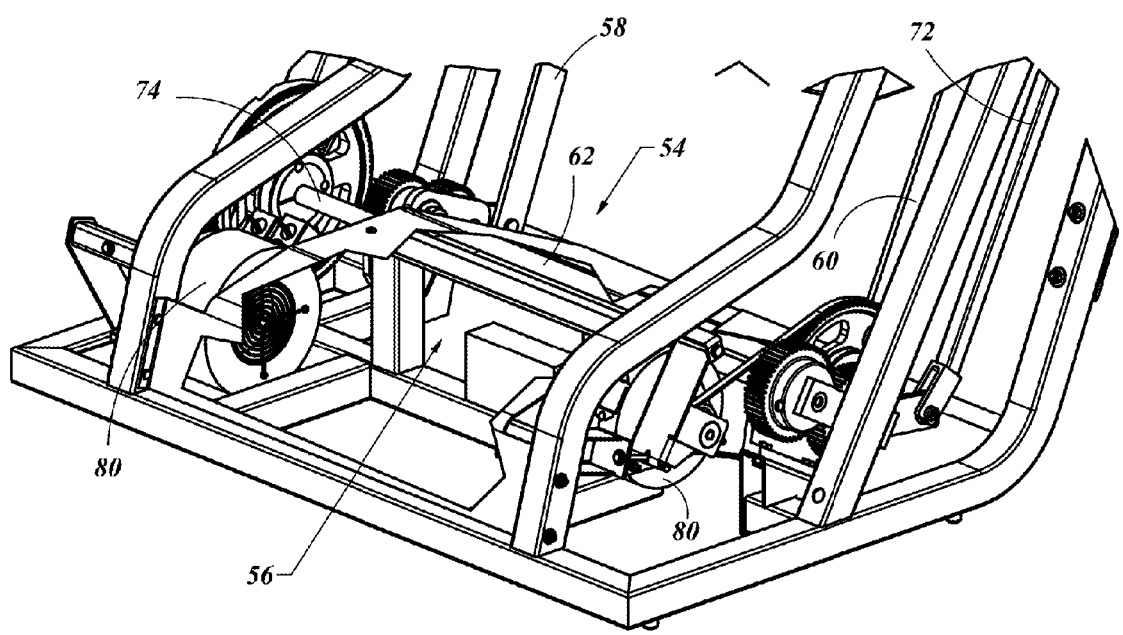
FIG. 2 is an isometric partial detail of a transfer system with a portion of the frame removed for visual clarity, the view shown along line 2-2 in FIG. 1.
Figures 3, 4:
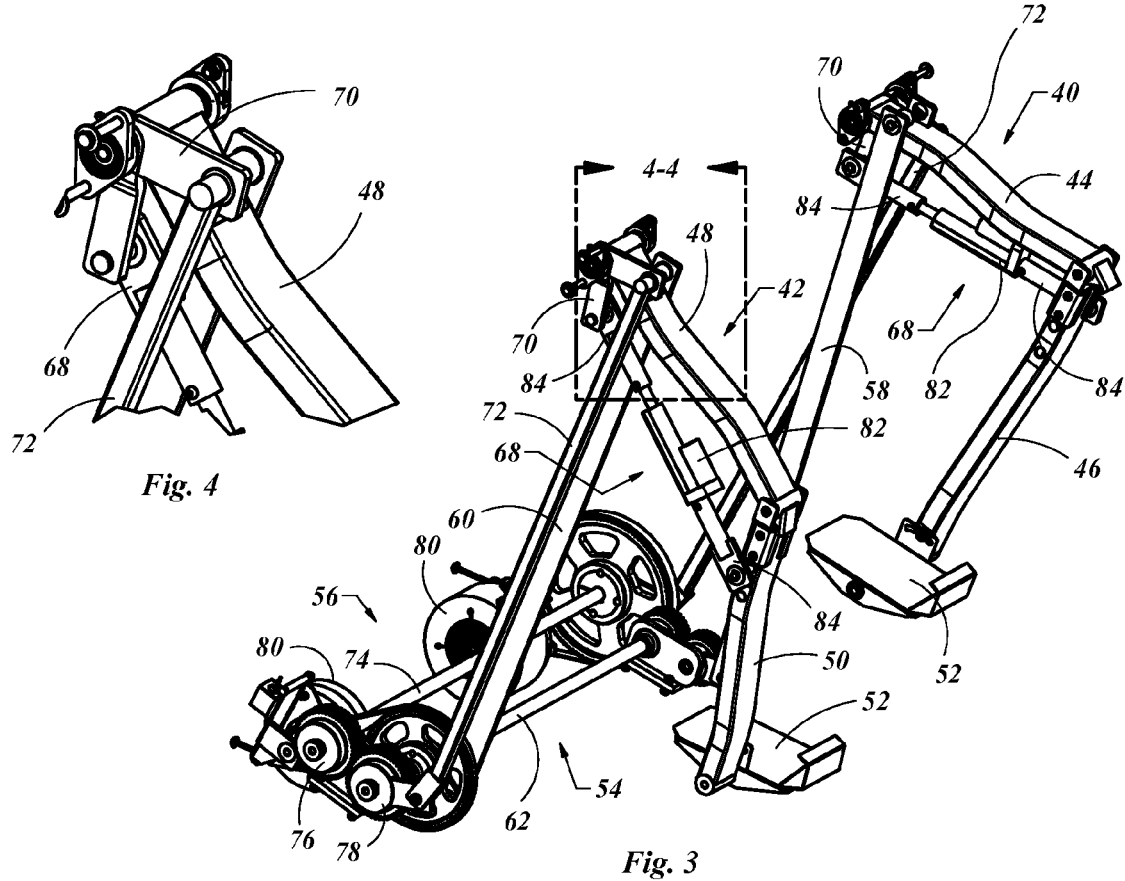
FIG. 3 is an isometric view of a linkage system of the exercise device shown in FIG. 1 with the frame removed.
FIG. 4 is an isometric view of a detail of an upper leg link pivot of the linkage shown in FIG. 3, the detail shown in FIG. 3 along line 4-4.

With reference to FIGS. 2, 3 and 5, a means of offering resistance is provided. When a person runs or walks on a flat surface with no wind, there is no resistance to motion. The runner's potential energy is the same at the end of the run as it was at the beginning of the running workout. Energy has been expended through the mechanics of the running or walking gait. The center of mass of the user is lifted and dropped in each stride. In addition, the mass of the leg segments have been accelerated to provide a complex motion that is repeated with every stride. This is work done by the runner where no energy has been stored, but it has been expended by the runner. These aspects of energy expenditure may also be apparent with the invention disclosed herein. The running gait of the legs may be identical to that of a runner on a flat or graded surface and therefore the energy required by the user to manipulate and change direction of the legs is provided by the user. This may be exaggerated by the mass of the first leg linkage 40 and the second leg linkage 42 that are added to the mass of the runner's legs. The vertical displacement of the center of mass of the user may also be provided with the present invention.

In some cases it may be desired to add additional resistance to the movement of the first transfer system 54, the second transfer system 56, or both. This may be accomplished by a brake 80 or other resistance element to either transfer system (54 & 56). In FIGS. 2, 3 and 5 a brake 80 is added to resist the rotation of the first transfer bar 62 of the first transfer system 54 and a second brake 80 is provided to resist rotation of the second transfer bar 74 of the second transfer system 56. One or both brakes 80 may be used to add torque to their respective transfer system (54 & 56) to increase the workload as if a runner was training by running in soft sand. In addition, by adding resistance to one or the other transfer system (54 & 56) the running gait may be modified for the user. This may be desired if a deficiency is identified and specific training is needed to correct that deficiency.

Another use of the brakes 80 is to add support to the foot supports 52 during ingress and egress of the user with the machine. By engaging both brakes 80, the foot supports 52 may be effectively locked in position and then slowly released to provide a method of smooth and stable entering and exiting of the exercise device 38. By reducing any rapid movements during the ingress and egress, the user is much less likely to feel unstable, thereby possibly reducing the likelihood of feeling unstable.

In that the system as described provides a stable platform for the user by placing one foot support 52 is a specific position in space, as determined by the other foot support 52, it may be desirable to alter this relationship between the foot supports 52. One method of accomplishing this is to alter the length of the third transfer members 68. As depicted in FIGS. 1, 3 and 5, the third transfer members 68 may include an actuator 82 with a bearing mount 84 on each end thereof. The actuator 82 enables the distance between the bearing mounts 84 to be changed, thereby altering the angle between the first upper link 44 and the first lower link 46 and likewise between the second upper link 48 and the second lower link 50. By altering these angles, the position of the foot supports 52 is changed relative to the frame 36 and therefore relative to one another, thereby altering the gait patterns.

Figure 7:
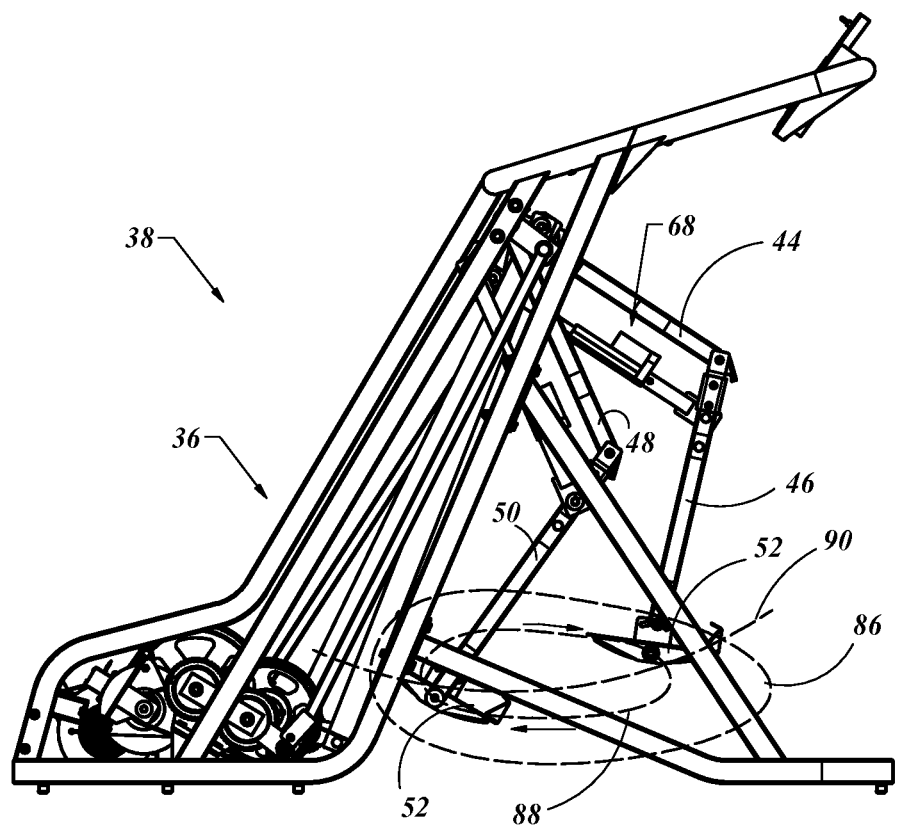
FIG. 7 is a side view of the exercise device of FIG. 1 with dashed lines illustrating different walking and running pedal paths.
Figure 8:
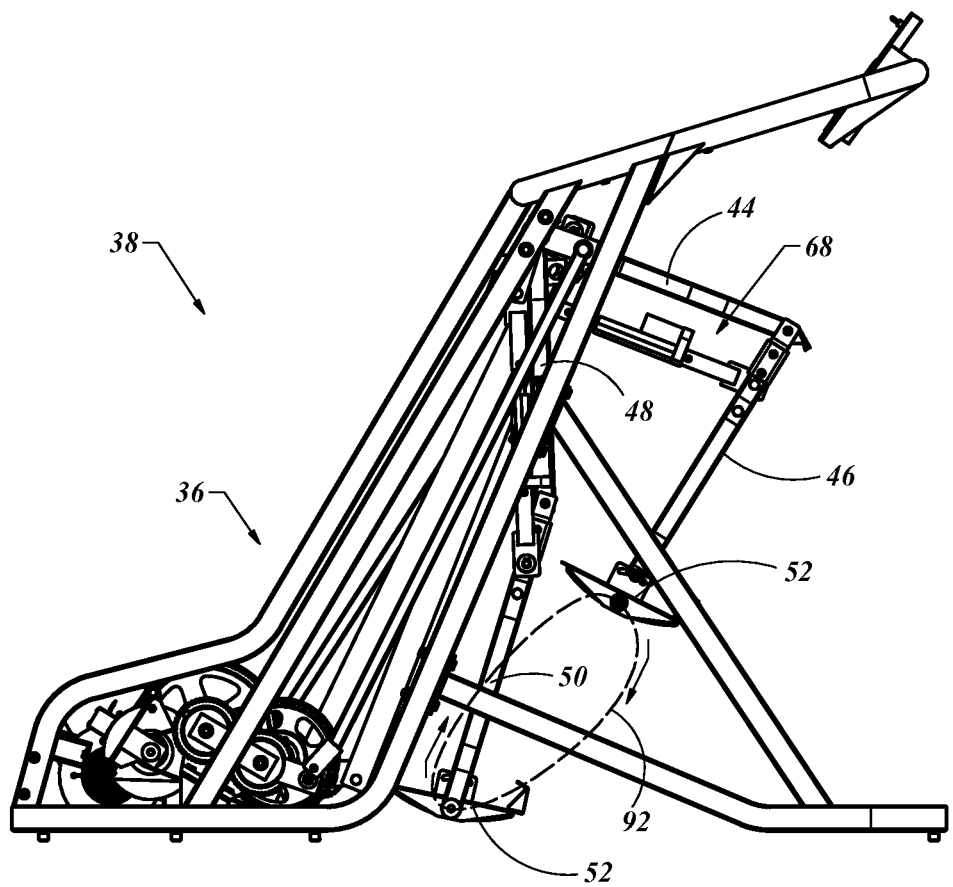
FIG. 8 is a side view of the exercise device of FIG. 1 with dashed lines illustrating an inclined step pedal path.
Figure 9:
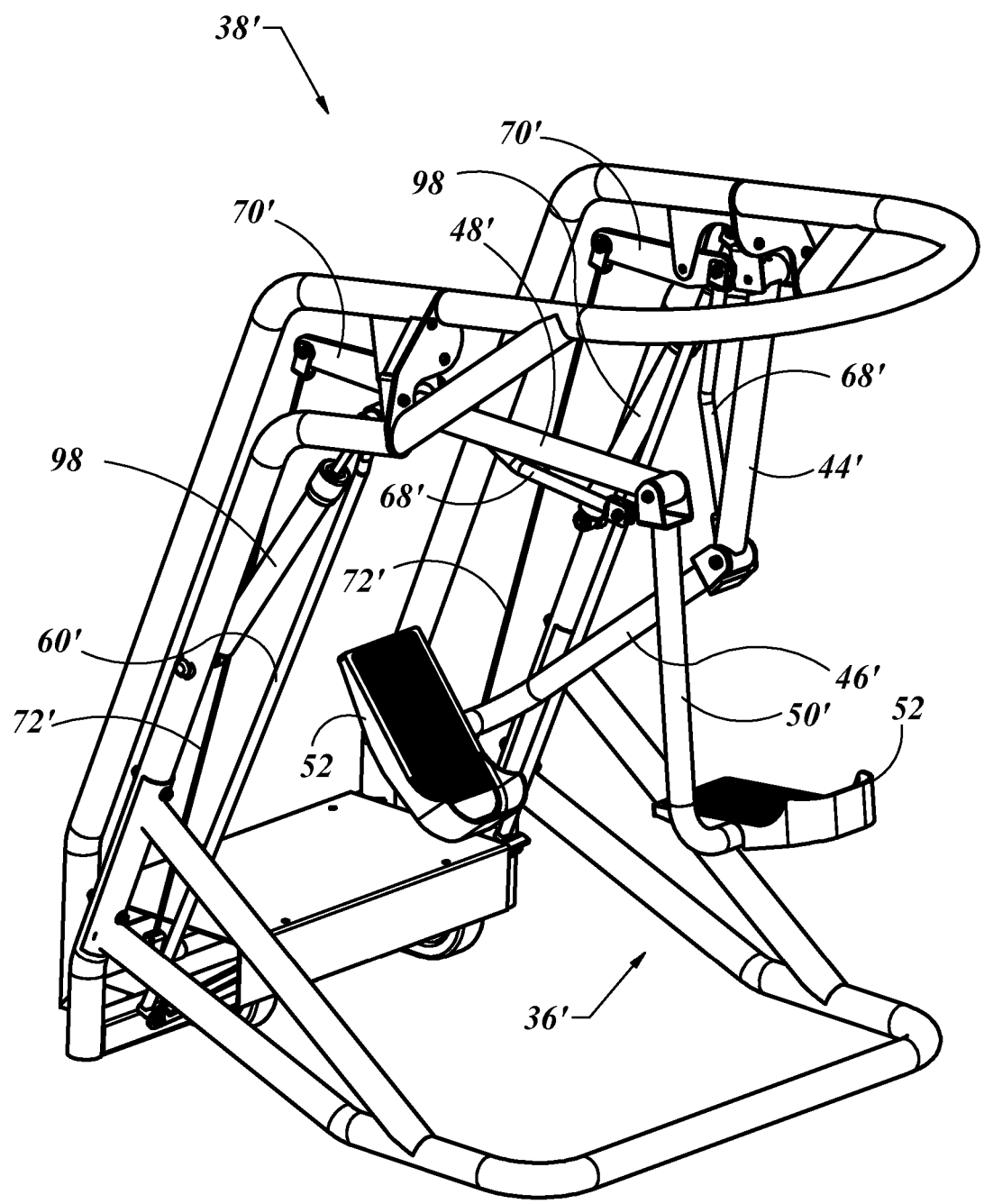
FIG. 9 is an isometric view of an exercise device incorporating a system enabling varied gait movements, the device including a transfer system comprising a pivot bar.
Figure 12:
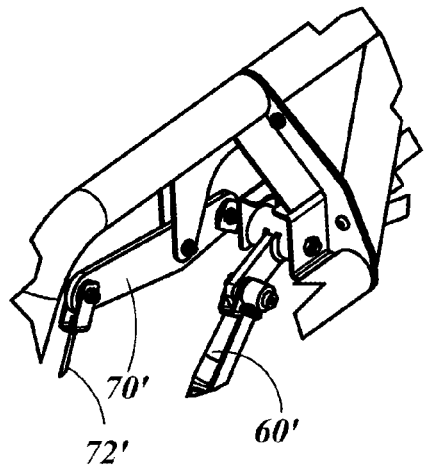
FIG. 12 is a detail of the device of FIG. 10 Shown along line 12-12, illustrating an upper link pivot area in more detail.
Figure 10:
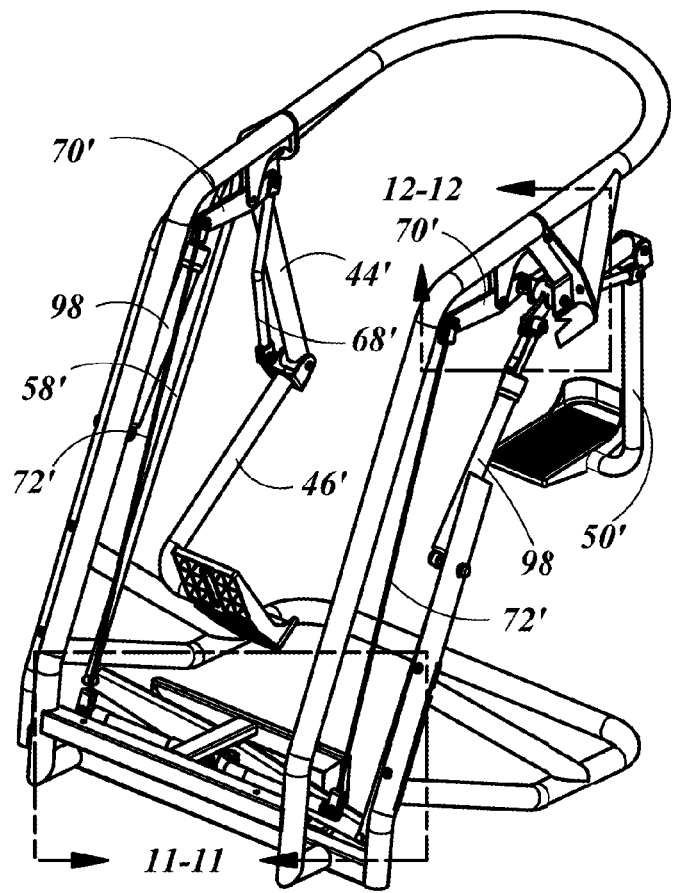
FIG. 10 is a rear isometric view of the device of FIG. 9 with a cover removed to show a transfer system.
Figure 11:
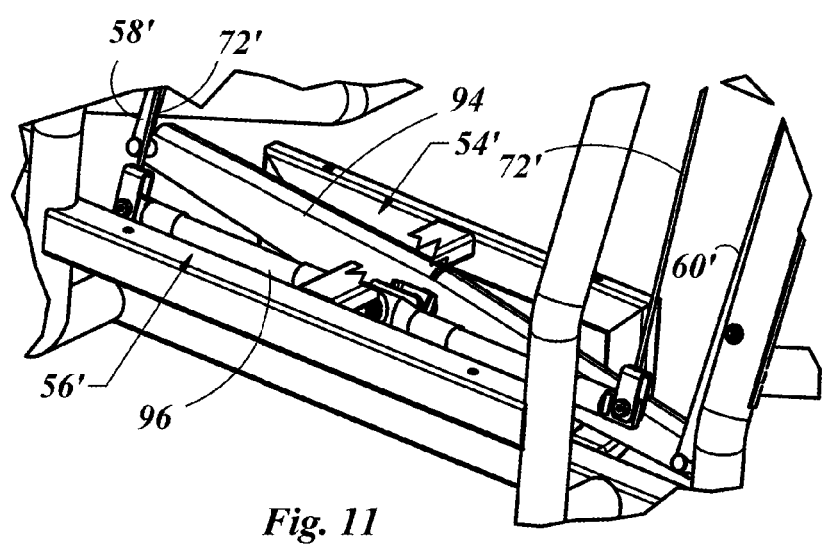
FIG. 11 is a detail of the device of FIG. 10 shown along line 11-11, illustrating a transfer system in more detail.
Figures 13, 14:
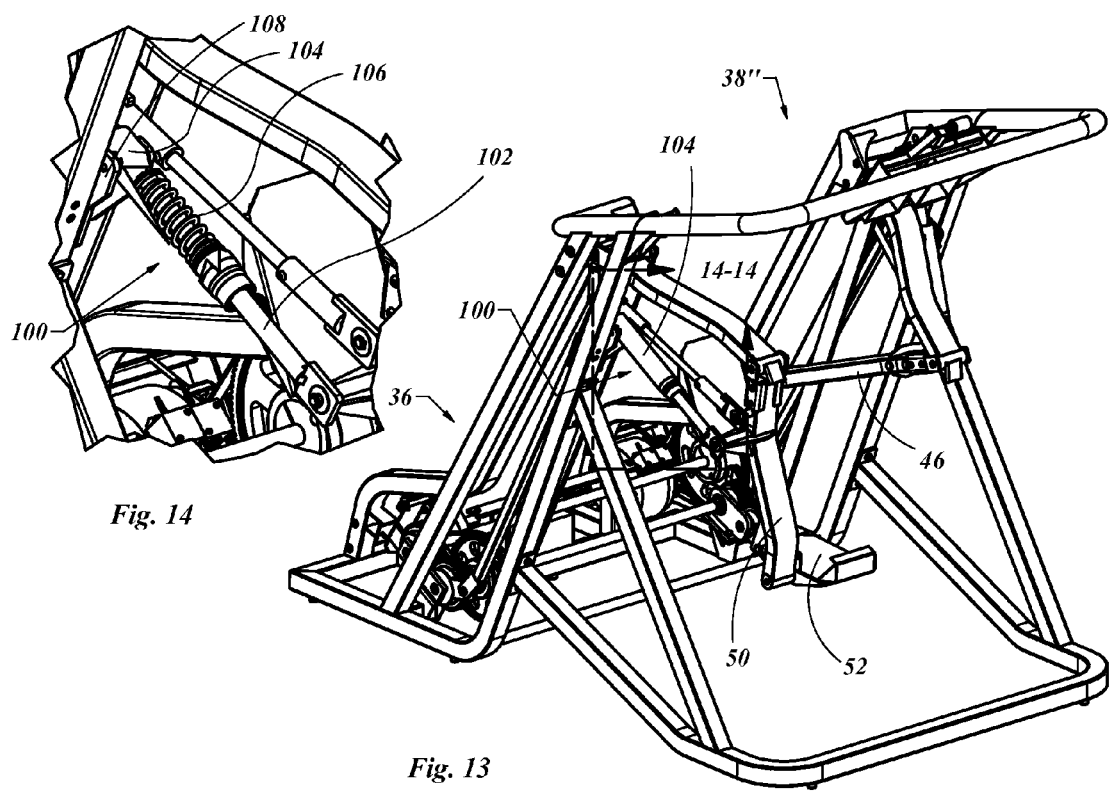
FIG. 13 is an isometric view of an exercise device incorporating a system enabling varied gait movements and including a support system including a compression link.
FIG. 14 is a detail of the device of FIG. 13 shown along line 14-14, illustrating a compression link with the cover partially removed.

Some examples of the variations in gait patterns that may be obtained, without altering the length of the third transfer members 68, are shown in FIGS. 7 and 8. In FIG. 7 the longer path 86 is consistent with a desired foot path of travel for a running gait. For a walking gait, a shorter path 88 is shown. The invention 38 automatically relates the amplitude (vertical height) of the travel of the foot support 52 to the longitude (stride length) as these also naturally correlate in typical gait patterns in people. Therefore in many cases the invention 38 may not need to be altered to have the user transition from one gait pattern to another during use. This enables a smooth and fluid transition from one gait to another. If it is desired to alter the path, the third transfer member 68 may be changed during use without the user stopping the machine 38. The arcuate path 90 depicts a pendulum path which may be used as a recovery gait.

In FIG. 8 a more extreme vertical path 92 of movement is shown. Again, this may be provided without altering the length of the third transfer member 68. It shows a foot path that may be consistent with climbing stairs or a steep incline hill such as in hiking. The capability of the device 38 enables a great deal of versatility that is expressed only by a few of the infinite number of gait patterns possible by the device 38.

The gate patterns may be controlled to guide the user into a specific pattern by replacing the brakes 80 with drive motors, such as servo or stepper motors. One embodiment of this system is to make one transfer system a driver and the other transfer system driven. For illustrative purposes, a system will be described where the first transfer system 54 is the driver and the second transfer system 56 is driven. It is understood that the status of driver and driven may be reversed and the system as described may be substantially the same only reversed with regard to which is sensed and which is driven. With that in mind, using servo motors to replace each of the brakes 80, provides a means of developing torque about the first transfer bar 62 and the second transfer bar 74. In that servo motors have a shaft location device built in, there would not be a need for an external encoder or other device to sense the position, direction and speed of the motor shafts, and therefore the associated first transfer bar 62 and the second transfer bar 74. If a stepper motor is used in place of servo motors to replace the brakes 80, then a sensing device of at least the first transfer bar 62 would be used.

In this embodiment, as a user drives a foot support 52 some direction at some speed, and the first upper link 44 and therefore also the second upper link 48 are displaced, the first transfer bar 62 will rotate some amount, in some direction, and at some speed. A sensor, such as the encoder in the servo motor, may be used to gather the information about the location, direction of movement and speed of movement of the motor and therefore the first transfer bar 62. This information may be used to determine the gait pattern, as this information may be specific to a particular gait pattern, or a specific gait pattern may be pre-selected by the user. An algorithm may be provided to correlate the location and direction of movement of the first transfer bar 62 (driver) to a desired position of the second transfer bar 74 (driven) for that gait pattern. The motor (formally the brake 80) associated with the second transfer bar 74 may be actuated to drive the second transfer bar 74 to the position as determined by the information of the first transfer bar 62 as computed by the algorithm. This process electronically links the first transfer system 54 to the second transfer system 56 while still allowing the user to determine the path and speed of movement of the foot supports 52, and therefore the feet of the user. By linking the first transfer system 54 to the second transfer system 56 a defined path of motion of the foot supports 52 may be provided. Through an electronic linking, how they are linked may be infinitely variable. With current processor technology a read and react closed loop system of 500-1000 Hz is possible, providing for a smooth path with little or no "cogging" of the movement making this a viable system with technology currently available.

With reference to FIGS. 9-12, another embodiment of the current invention 38' is shown. In this embodiment the invention 38' has a first upper link 44' a second upper link 48', a first lower link 46', a second lower link 50' and a third transfer member 68' connected to the first lower link 46' and the second lower link 50'. The transfer coupling 70' transfers load from the third transfer members 68' to the fourth transfer members 72' and a first transfer member 58' is coupled to a second transfer member 60' by way of a first transfer system 54', comprising a pivoting arm 94, thereby providing substantially reciprocating motion of the first transfer member 58' to the second transfer member 60'.

A second transfer system 56' is provided to accomplish a similar reciprocating motion of the fourth transfer members 72'. In this embodiment the transfer coupling 70' is substantially longitudinal providing a classic $1^{st}$ class lever as opposed to the previously disclosed embodiment where the load and the force may be considered to be on the same side of the fulcrum ($2^{nd}$ or $3^{rd}$ class lever). In this case the load in the fourth transfer members 72' may always be in tension. As such, a pliable member such as a cord or cable may be used as opposed to a rigid structural element such as a steel bar. A second pivot arm 96 may provide the substantially reciprocating motion for the fourth transfer members 72', that as with the pivoting arm 94, the second pivoting arm 96 is a substantially rigid arm that is pivotally mounted to the frame, about a center point along the long axis, the ends free to move so as one end is lowered, the other end is raised relative to the frame 36'. This action enables the respective transfer members (72' to 72' and 58' to 60') to move in a substantially reciprocating manner relative to one another. In this embodiment a hydraulic damper 98 may be used to offer resistance to movement of one or both transfer systems (54' and 56'). The damper 98 may be attached to the first transfer member 58' and the second transfer member 60' at or near the transfer couplings 70' or at any other place in the system.

An alternative embodiment of the invention including a support system 99 comprised of a compression link 100 is shown in FIGS. 13-18. The compression link 100 may be two compression links 100, each with a shaft 102, both shafts 102 with a first end coupled to each of the first lower link 46, and the second lower link 50. The shaft 102 of each compression link 100 may be received by a sleeve 104, which may be coupled to a link mount 108, which may be mounted to the frame 36. A compression spring 106 may be received within the sleeve 104. The spring 106 may act as a bias against extension of the shaft 102 out of the sleeve 104. By doing so, the expanded distance of the compression link 100 is limited by the spring and the extension force on the shaft 102. With one end of the compression link 100 coupled to the frame, by way of the link mount 108, and the other end coupled to the lower links (46 & 50) of the device 38", the lowest position of the foot support 52 is restricted by the compression force of the spring 106 of the compression link 100. In doing so, as a user passes through the stance phase of running, where the highest normal force is applied to a supporting surface, the greatest tension will be placed on the spring 106. This may allow the greatest length of the compression link 100.

Figures 15, 16:
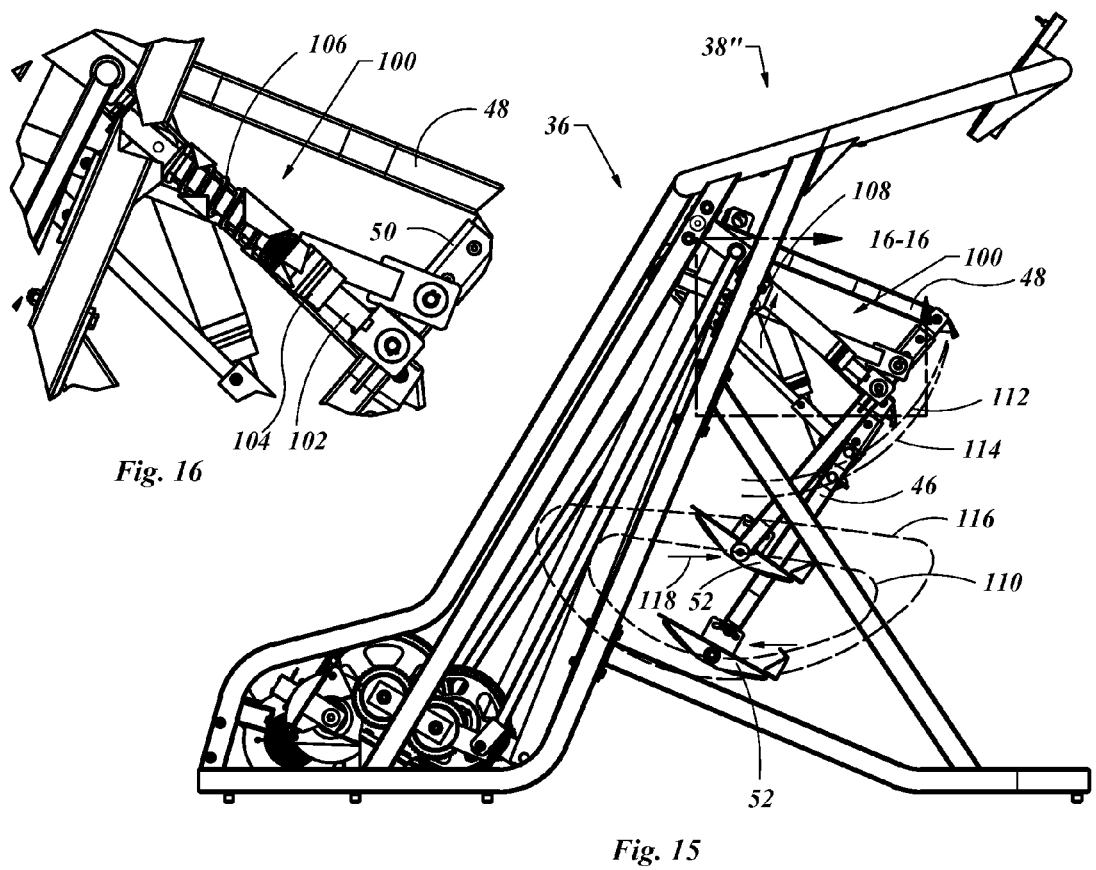
FIG. 15 is a side view of the device of FIG. 13 showing different pedal paths as may be guided by a compression link positioned in different positions relative to the frame, and the pedals in a relatively vertical orientation.
FIG. 16 is a detail of the device of FIG. 15 shown along line 16-16, illustrating a compression link with the cover partially removed.
Figure 19:
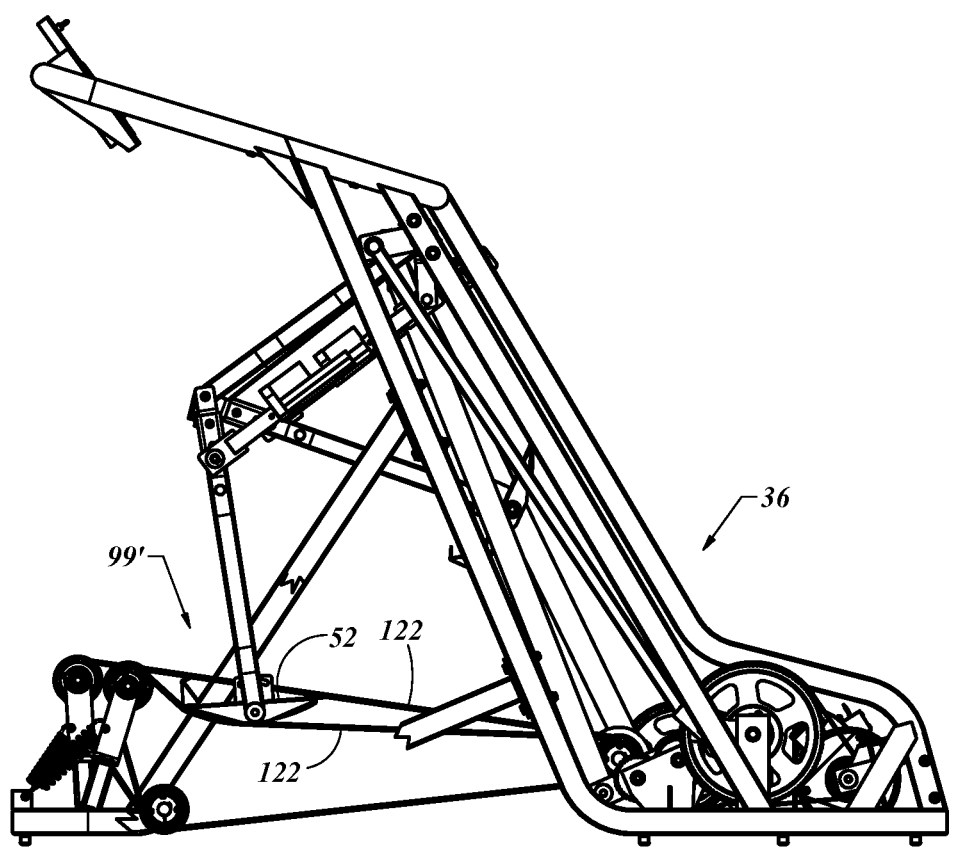
FIG. 19 is a side view of an exercise device incorporating a system enabling varied gait movements and including a support system comprising a belt.

As is illustrated in FIG. 15, the small curve 110 is representative of the foot support 52 path of travel for a walking gait. It can be seen that at the bottom position of the foot support 52, a smooth arcuate path may be provided. As the user begins to shift their weight onto the top foot support 52, as the foot transitions forward during the "swing phase", the forward foot will begin to drop as the trailing foot begins to raise as the users weight is transferred from the foot ending the stance phase (approaching "toe off" to transition to the swing phase) to the foot ending the swing phase (approaching "heel strike" to transition to the stance phase). As the user's body weight begins to be removed from the stance (bottom) foot, the spring 106 may bias the shaft 102 in toward the sleeve 104, thereby shortening overall length of the compression link 100. This will pull the lower link 46, and therefore the foot support 52 on which the user's foot is positioned, towards the link mount 108, thereby guiding the foot support 52 up in a desired gait pattern 110.

The gait amplitude may be altered by changing the relative position of the link mount 108 on the frame 36. The top arc 112 shown in FIG. 15 is a path of the connection of the compression link 100 to the first lower link 46 throughout the stance phase (when supporting the user's body weight). The bottom arc 114 is representative of the path of the connection of the compression link 100 to the first lower link 46 throughout the stance phase (when supporting the user's body weight) when the link mount 108 is lowered on the frame 36. This may result in a path of travel represented by the second path 116 of travel of the foot supports 52. This greater amplitude of foot travel may be representative of a running gait, as compared to a walking gait of the shorter path 110. Therefore the desired gait pattern may be altered by changing the position of the link mount 108.

To further illustrate the function of the compression link 100, the device 38" with compression links 100 and cut away details are shown in FIGS. 15-18. In FIG. 15 the second lower link 50 is shown in a elevated position as would be evident with a user with their foot on the foot supports 52 and their right foot at an approximate midpoint along the forward moving 118 swing phase of a walking gait. In this, the right foot of the user is likely unloaded as the user's weight is supported on the other (left) foot on the foot support of the first lower link 46. The detail in the cutaway is shown in FIG. 16 of the compression link 100 of this, the unloaded foot support 52 in the swing phase. The spring 106 of the compression link 100 is in a relaxed position as the shaft 102 is received within the sleeve 104, not placing pressure on the spring 106.

In FIG. 17, the link mount 108 has been moved down to allow the foot supports 52 to achieve greater amplitude in their movement gait. In addition, the second lower link 50 and second upper link 48 have moved to position the corresponding foot support 52 in a position to simulate past heel strike and the beginning of the stance phase of a running gait, where the foot support 52 path of travel approximates the larger amplitude second path 116. The detail cutaway in FIG. 18 shows the spring 106 in a compressed state as compared to that of FIG. 16. This is due to the shaft stop 120 contacting one end of the spring 106 as it is trapped inside the sleeve 104. Therefore as the shaft 102 extends out away from the sleeve 104, the spring 106 is compressed, biasing the compression link 100 to a more retracted position.

An alternative support system is shown in FIGS. 19-22 in which the support system 99' includes a support belt 122 movably coupled to the frame 36. The belt 122 may be two separate but identical belts 122 positioned in a parallel arrangement proximal to the foot supports 52 so that when a foot support 52 descends to a predetermined height relative to the frame, a portion of the foot support 52 contacts the belt 122, thereby limiting the bottom most position of the foot support 52. One embodiment is shown in which there are two belts 122, each supported by a front base pulley 124 and a rear base pulley 126. It may be desired to provide elastomeric properties to the support of the foot supports 52, as so suggested by the use of the compression spring 106 in the compression link 100, as previously shown and described. In this embodiment, a similar cushioned support may be achieved by providing a belt 122 that includes elastic properties. As such, the belt 122 may flex or stretch as the foot support contacts an upper run 128 of the belt 122. As the user provides force to the foot support during the stance phase of the gait the belt 122 may flex to allow some compliance to the load applied by the weight of the user.

An alternative form of elastomeric support of the foot supports 52, is to use a substantially non-elastic belt 122 as defined by little elongation of the belt 122 under load. An idler 130 may be provided with a bias member 132 positioned to maintain tension in the belt 122. As is shown in FIGS. 20 and 21, when a foot support 52 makes contact with the upper run 128 of the belt 122, the idler 130 is displaced to accommodate for the displacement in the upper run 128 of the belt 122 due to the normal load applied through the foot support 52.

The rear portion of the alternative support system 99' is shown in detail in FIG. 22. The belts 122 are supported by the rear base pulleys 126. If a brake or other resistance to movement of the foot supports 52 is required, a shaft drive 134 may be used to restrict the rotation of the rear base pulleys 126 and thereby the belts 122, thus requiring work to be done by the user. As an alternative, the shaft drive 134 may also be a positive drive, thereby driving the rear base pulleys 126 and therefore the belts 122. By driving the belts 122, when a foot support contacts the upper run 128 of a belt 122, the foot support 52 may be actively driven back as would normally be done when a user's foot moves during a running or walking gait. In that the foot supports 52 may be linked as previously noted, when one foot support 52 is moving in a posterior direction relative to the user, as a support foot would in a typical walking or running gait, the other foot support is elevated and moving in an anterior direction. This powered system may enable walking or running guidance for an impaired individual, thereby physically training the muscles. In addition, since the stride length is determined by the user, there is some neurological requirement for control by the user. In neurologically impaired individuals, such as stroke survivors, neurological training may be as important as muscular training. By adding a harness to support the weight of the user and eliminate falling, a system as shown and described may be more beneficial to the rehabilitation of neurologically impaired individuals than more costly and complex fully controlled ambulatory training devices.

Figure 23:
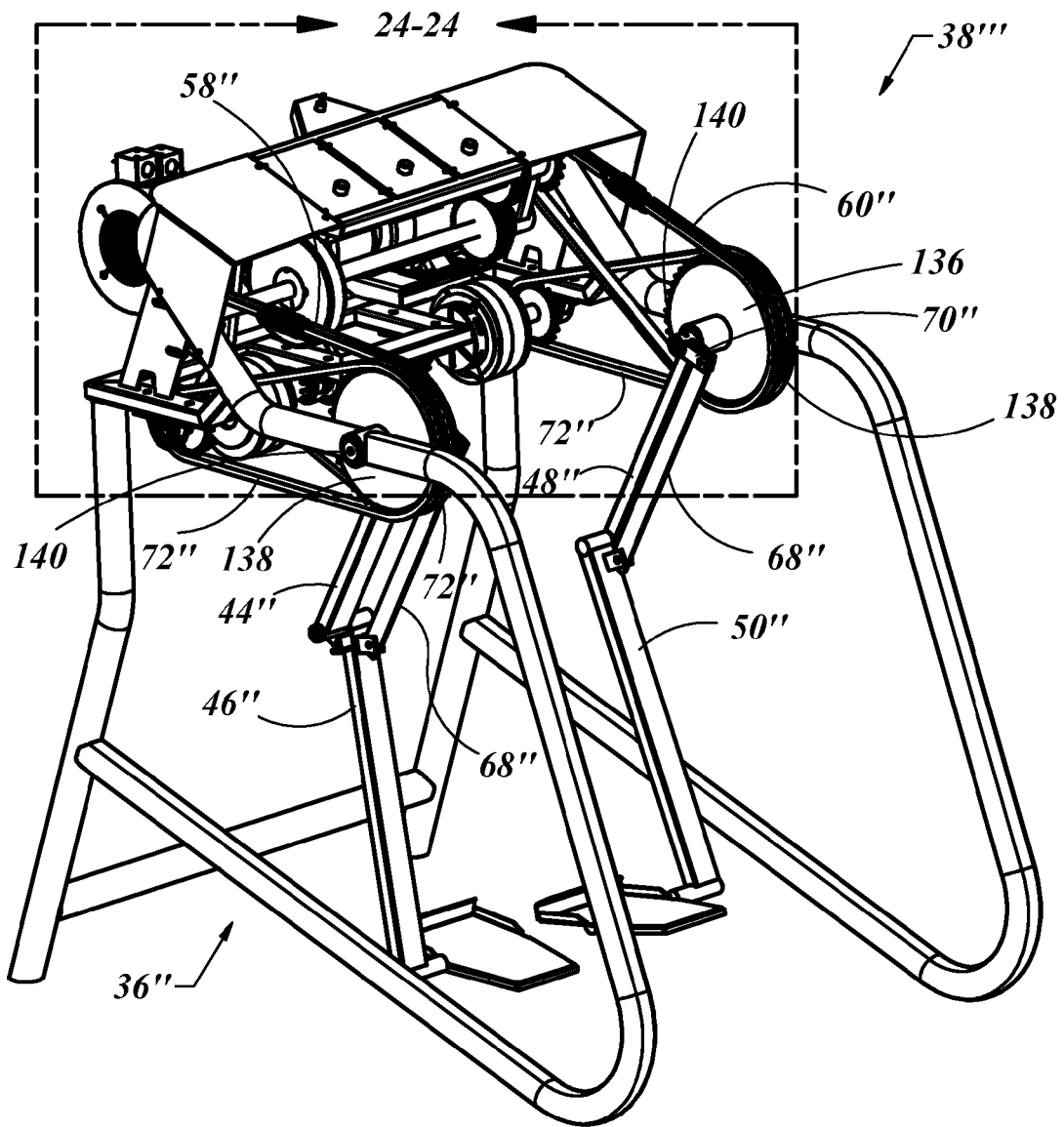
FIG. 23 is a rear isometric view of an exercise device incorporating a system enabling varied gait movements in accordance with the present invention.
Figure 24:
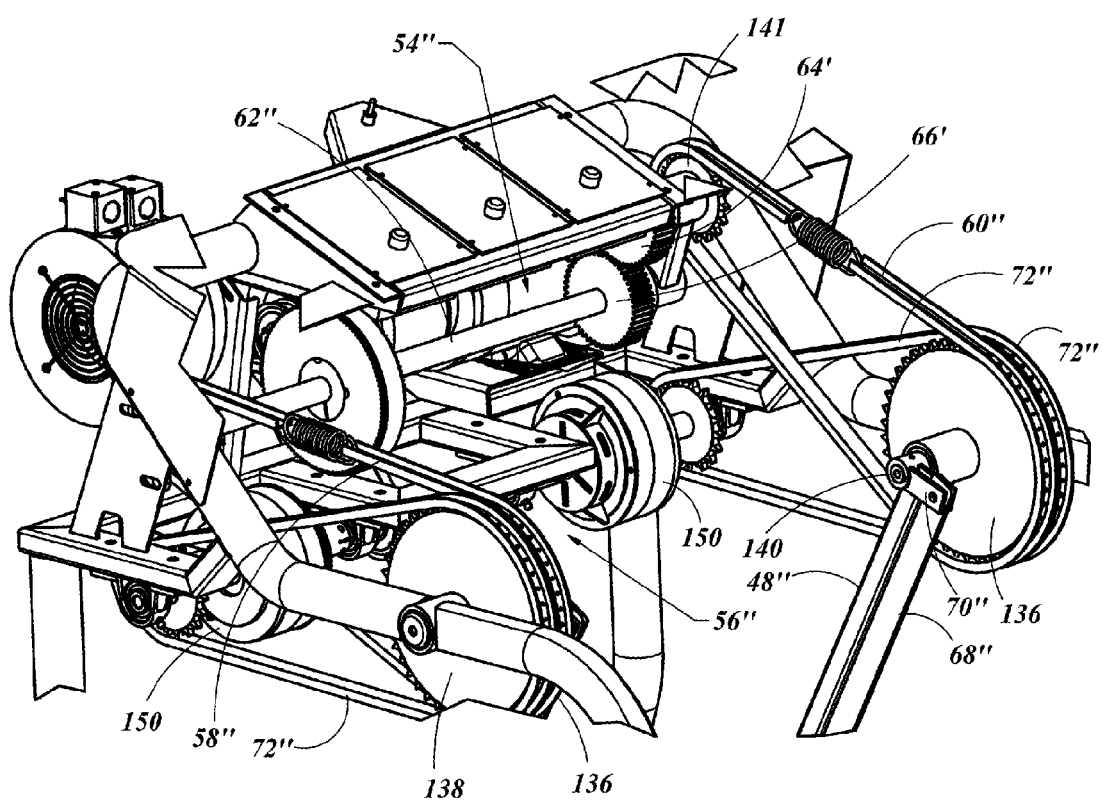
FIG. 24 is a detail of the device of FIG. 23 shown along line 24-24, showing a rear view of drive elements of the device.
Figure 25:
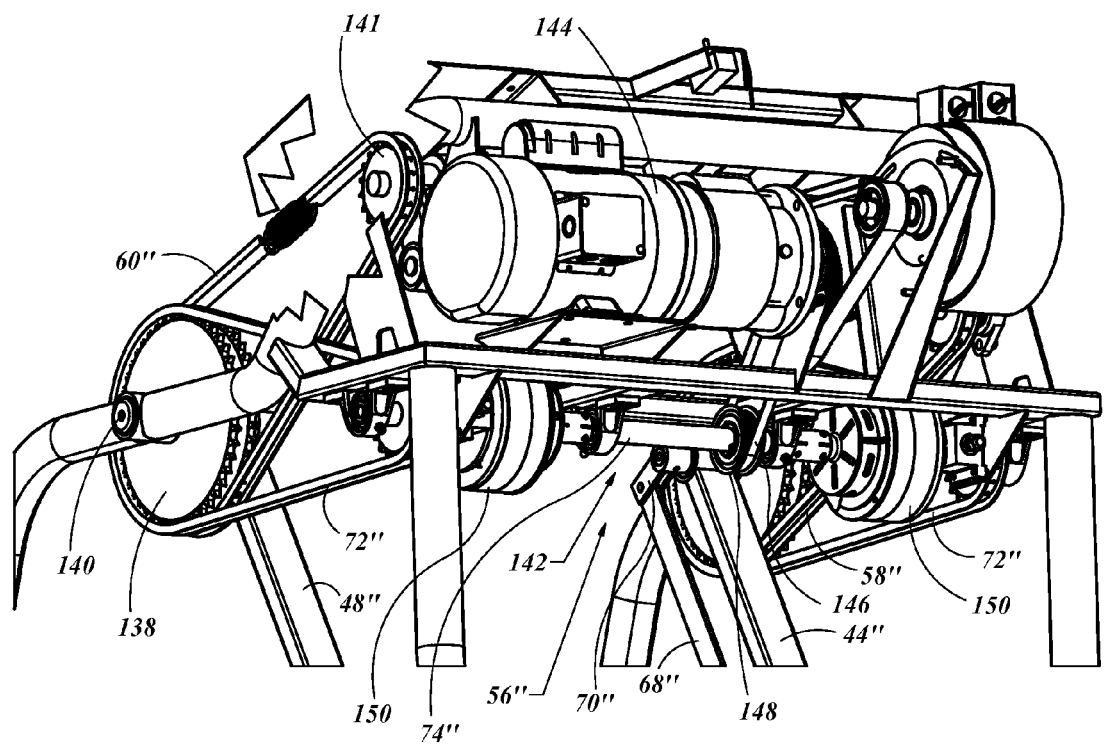
FIG. 25 is a front view of the drive elements of the device of FIG. 23.
Figure 26:
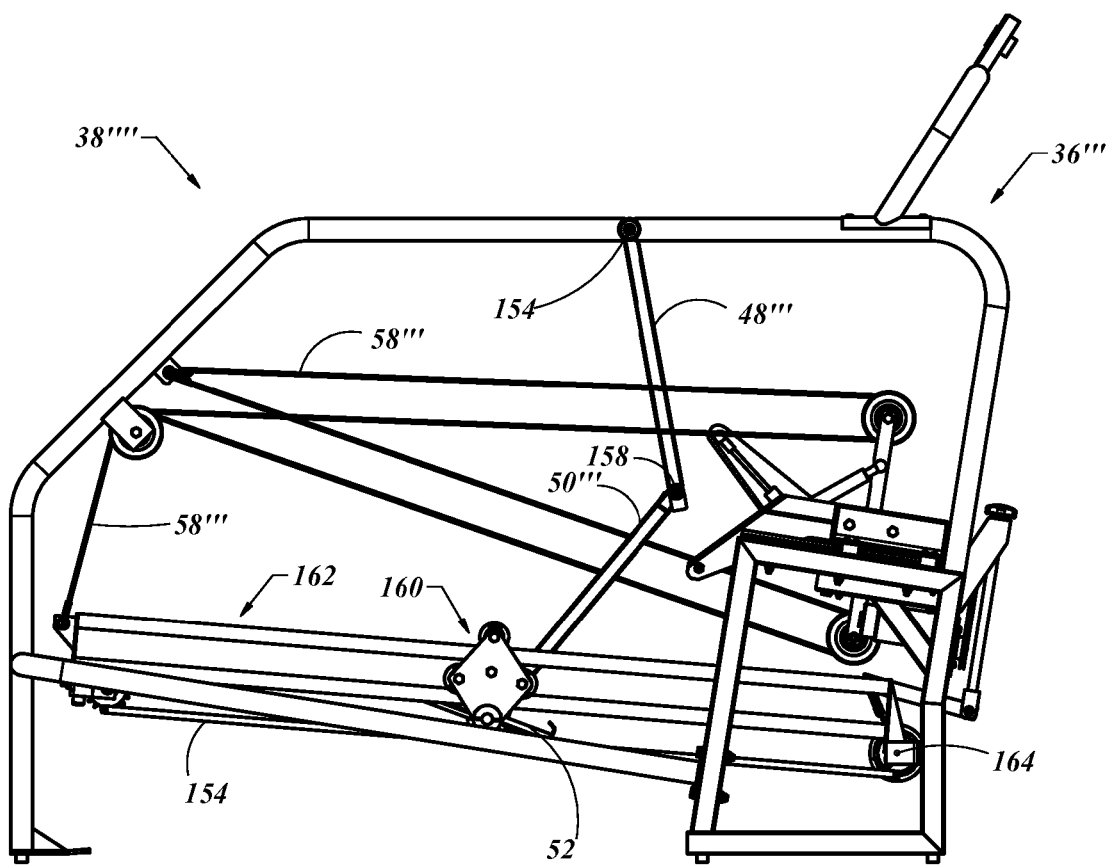
FIG. 26 is a side view of an exercise device incorporating a system enabling varied gait movements and providing an articulating leg.
Figures 27, 28:
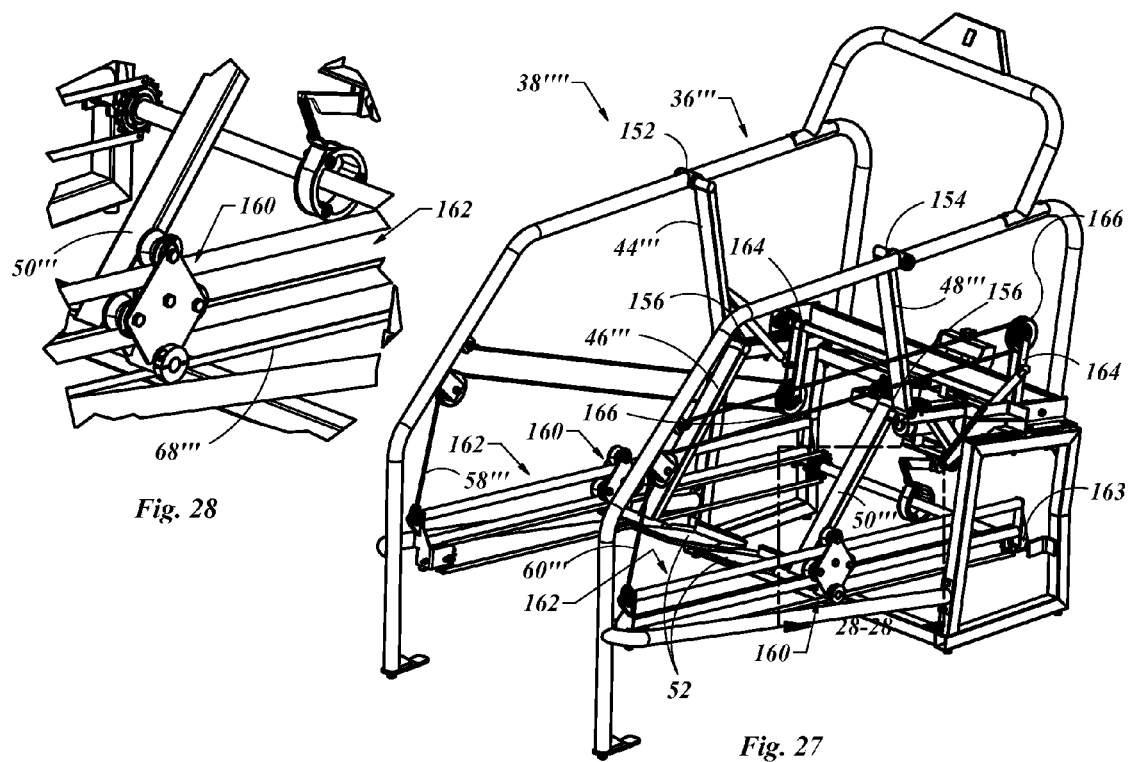
FIG. 27 is an isometric view of the device of FIG. 26.
FIG. 28 is a detail of the device of FIG. 27 shown along line 28-28, showing a side isometric view of support system elements of the device.

An alternative control system is shown in FIGS. 23-25. The training device 38''' in this embodiment includes a frame 36", which supports a first upper link 44" connected to a first lower link 46" and a foot support 52 on the lower end thereof. In a like manner, a second upper link 48" may be provided which may be pivotally coupled to the frame 36" and including a second lower link 50" with a foot support 52 coupled to the second lower link 50". A third transfer member 68" may be coupled to the first lower link 46" and another third transfer member 68" coupled to the second lower link 50". In this embodiment, the first upper link 44" and the second upper link 48" may each be mounted to an inside sprocket 136. The third transfer members 68" may be coupled to a transfer coupling 70", which may be connected to an outside sprocket 138 by way of a shaft 140 journaled to the frame 36".

A first transfer system 54" may be used to transfer the movement from the first upper link 44" to the second upper link 48" by way of the first transfer bar 62", which may connect the inside sprockets 136 through the first transfer member 58" and the second transfer member 60". In this embodiment the first transfer member 58" and the second transfer member 60" may be in the form of a roller chain, belt or other pliable transmission member as opposed to a substantially rigid link as shown in previous embodiments. The direction of movement of the first transfer member 58" may be substantially the opposite that of the second transfer member 60" by way of the first gear 64' coupled to the second gear 66' in a radial orientation. The substantially opposite rotation of the first gear 64' relative to the second gear 66' drives the sprocket 141 in an opposite direction to that of the first transfer bar 62". This combination enables a substantially reciprocating movement of the first upper link 44" relative to the second upper link 48".

In this embodiment of the invention, the first lower link 46" is in communication with the second lower link 50" by way of the third transfer members 68", as previously noted. The outside sprockets 138 drive the fourth transfer members 72" to the second transfer system 56", thereby linking the first lower link 46" to the second lower link 50". The second transfer system 56" may include a second transfer bar 74" to facilitate the transfer of power to the outside sprockets 138 and thereby to the first lower link 46" and the second lower link 50" by way of the third transfer members 68".

In this embodiment, substantially reciprocating motion of the first lower link 46" to the second lower link 50" may be achieved by a lower link control system 142. With attention to FIG. 25, a drive motor 144 is used to provide torque to the second transfer bar 74" by way of a drive belt 146 articulating a drive pulley 148 mounted to the second transfer bar 74". A pair of clutches 150 may be used to regulate the torque output from the second transfer bar 74", by way of the drive motor 144, to the fourth transfer members 72", which in turn apply force to the first lower link 46" and the second lower link 50". An advantage of such a lower link control system 142 is it may provide a capability to change the interaction between the first lower link 46" and the second lower link 50" that may be modified during use, according to the speed of movement, direction of movement and position in space of any of the leg links (44", 48", 46" and 50"). This enables a dynamic system that may be altered by user gait or speed. One or more sensors may be used to determine the speed or movement or orientation of a leg link relative to any other leg link and a logic system to read this information and adjust the clutches 150 to alter the torque about the joint of the first lower link 46" and the first upper link 44" as well as the joint of the second lower link 50" and the second upper link 48". By varying these torques, a gait pattern of the user may be mimicked or supported by the device 38' to enable a smooth and comfortable exercise session by a user.

Another embodiment of the device 38'''' is illustrated in FIGS. 26-31. A frame 36''' supports a first upper link 44''' and a second upper link 48''' about joints 152 and 154 respectively. A first lower link 46''' may be pivotally coupled to the first upper link 44''' at joint 156 and the second lower link 50''' may be coupled to the second upper link 48''' at joint 158. A pair of foot supports 52 may be located on a distal end of the first lower link 46' and the second lower link 50'''. This linkage combination may be similar in function to that as previously disclosed herein. There is a support guide 160 coupled to each of the first lower link 46''' and the second lower link 50''', possibly near the foot supports 52. The support guides 160 are each received by a guide rail 162, each guide rail 162 may be moveably mounted to the frame 36' about a shaft 163. The guide rails 162 may be made to move in a substantially reciprocating motion relative to one another by first transfer member 58''' and a second transfer member 60'''. A first transfer system 54''' includes a first transfer bar 62''' that many connect a pair of pulley arms 164 on each end of the first transfer bar 62'''. The pulley arms 164 may include a pulley 166 adapted to engage each of the first transfer member 58''' and the second transfer member 60'''. The pulley arms 164 may be located substantially on an opposite side of the first transfer bar 62''' so that from a side view as one pulley 166 moves substantially forward, the other pulley 166 moves substantially backward. This causes displacement of the first transfer member 58''' to be substantially opposite to that of the second transfer member 60''', thereby enabling a substantially reciprocating action of the guide rails 162 one to the other and with it the support guides 160 and foot supports 52 mounted adjacent to the support guides 160.

Movement of the support guides 160 along the guide rails 162 may be controlled by a third transfer member 68''' coupled to a lower portion of the support guides 160 and a fourth transfer member 72''' coupled to an upper portion of the support guides 160. The third transfer member 68''' on each side of the device 38'''' as well as the fourth transfer members 72''' are coupled to a second transfer system 56''' which includes a second transfer bar 74'''. In this embodiment the third transfer members 68' and the fourth transfer members 72' may be a pliable structure such as a roller chain, a belt or strap. The third transfer members 68''' and the fourth transfer members 72''' may couple to the second transfer bar 74''' by way of couplings 70'' in the form of sprockets or pulleys. This combination provides a substantially forward movement of one support guide 160, and therefore associated foot support 52, will result in a substantially rearward movement of the other support guide 160 and associated foot support 52. The combination of the first transfer system 54''' and the second transfer system 56''' and the associated links enable a substantially reciprocating motion along the guide rails 162 and the generally vertical displacement of the guide rails 162 simultaneously, thereby offering a stable platform to perform an infinite number of gait pattern movements of a user positioned on the foot supports 52.

Figure 29:
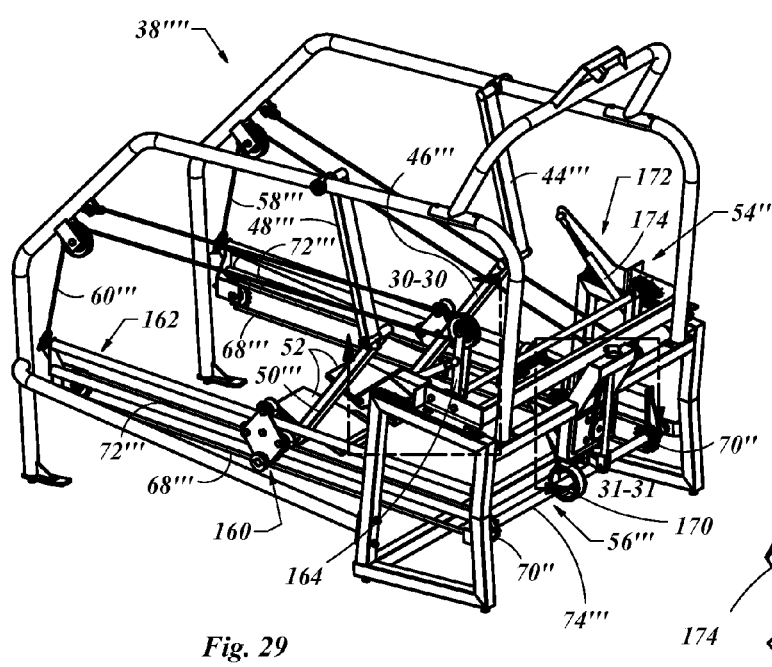
FIG. 29 is a right front isometric view of the device of FIG. 27.
Figure 31:
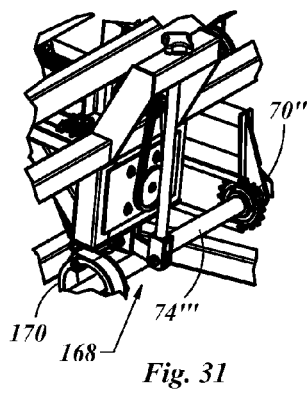
FIG. 31 is a detail of the device of FIG. 29 shown along line 31-31, showing a side isometric view of a resistance system of the device.
Figure 30:
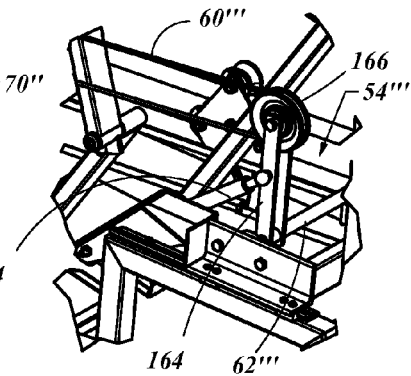
FIG. 30 is a detail of the device of FIG. 29 shown along line 30-30, showing a side isometric view of a front portion of a support system of the device.
Figure 32:
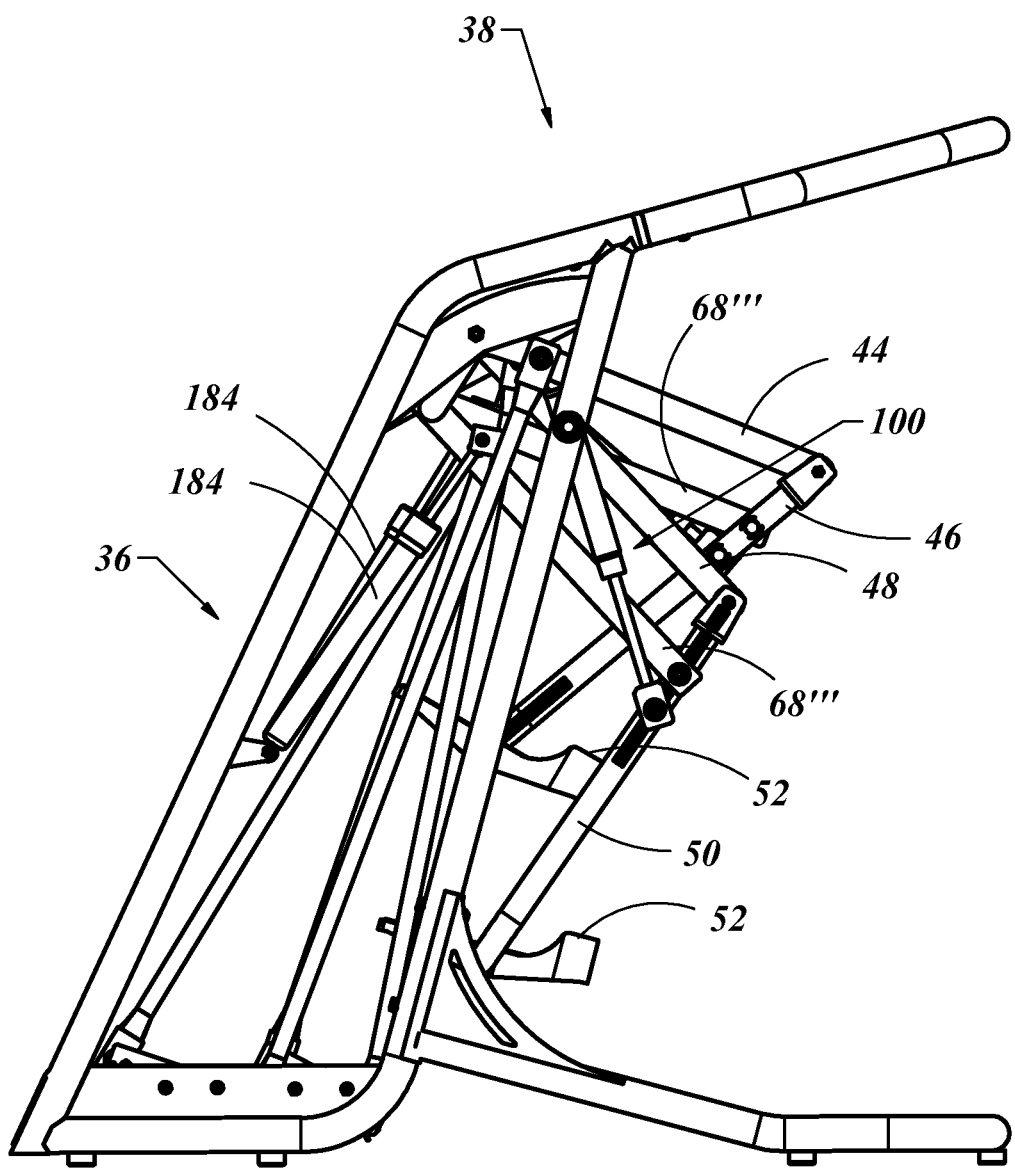
FIG. 32 is a side view of an exercise device incorporating a system enabling varied gait movements, the device including a transfer system comprising a pivot bar and a support system.
Figure 33:
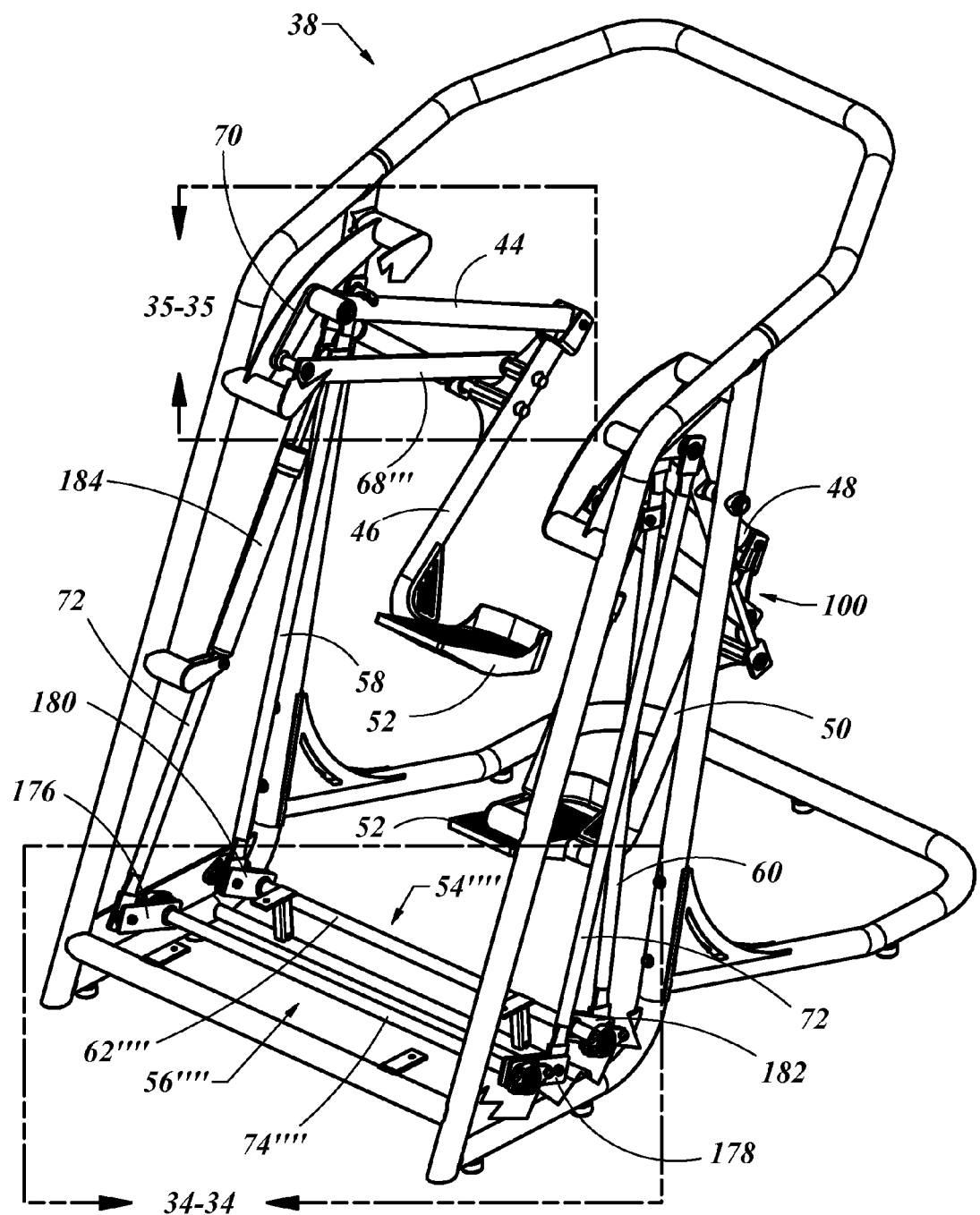
FIG. 33 is an isometric view of the device of FIG. 32 with a bottom cover and a portion of the frame removed.
Figure 34:
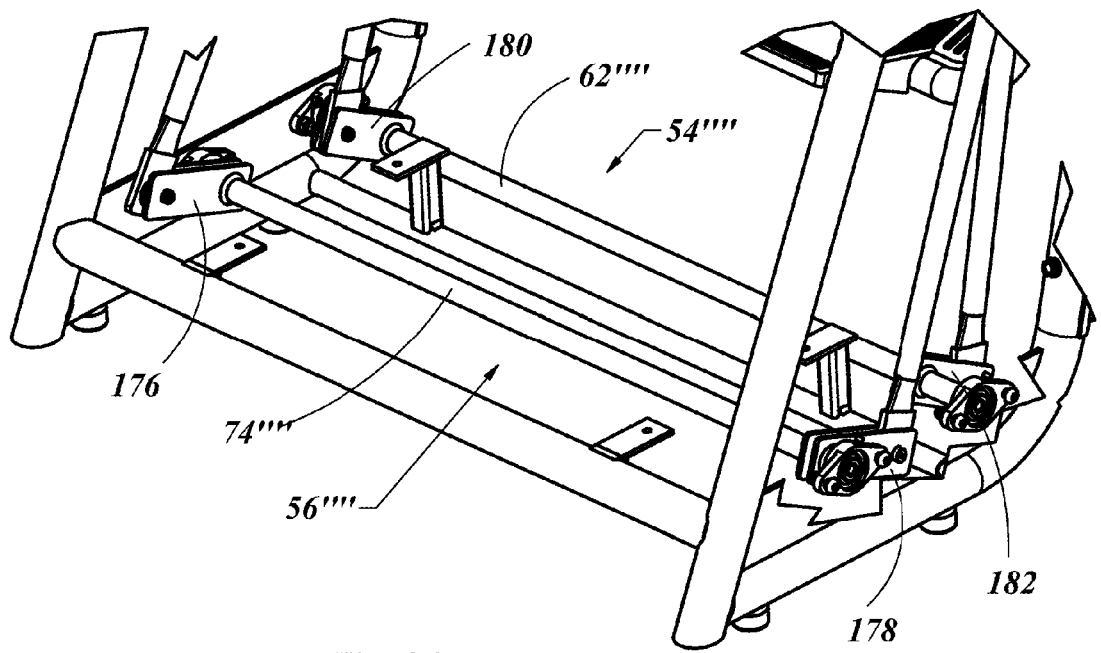
FIG. 34 is a detail of the device of FIG. 33 shown along line 34-34, showing an isometric view of a transfer system.
Figure 35:
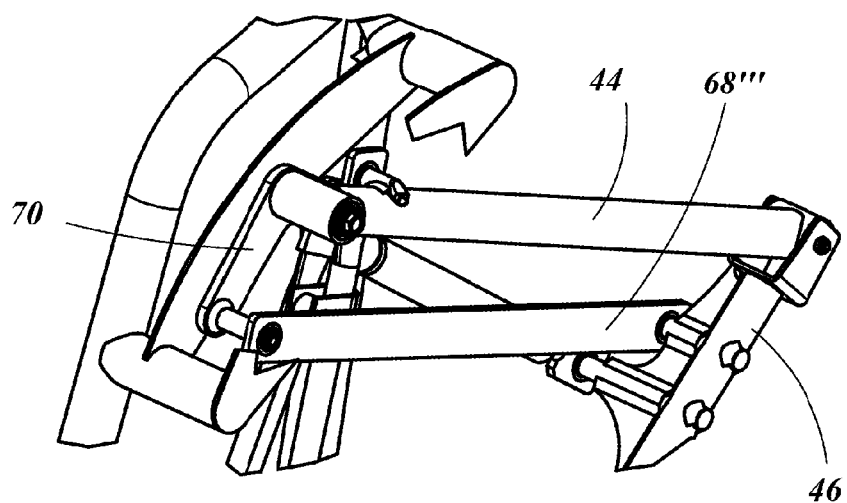
FIG. 35 is a detail of the device of FIG. 33 shown along line 35-35, showing an isometric view of an upper link and support system.

A resistance system 168 may also be provided to the second transfer system 56''' as shown in FIGS. 29-31 or to the first transfer system 54'''. The resistance system 168 may include a brake 170, motor or any other form of resistance to resist the movement of the second transfer bar 74'''. A spring centering system 172 may be included in the first transfer system 54''' to include a pair of springs 174''' to guide the first transfer system 54''' to a predefined position.

Referring to FIGS. 32-35 a device 38 produced in accordance with an alternative embodiment of the invention is shown. Some aspects of this embodiment are similar to those shown in previous figures are not designated with a unique prime value following the numerical designation. Similar to those embodiments previously noted a first upper link 44 is coupled to a first lower link 46 and a second upper link 48 is similarly coupled to a second lower link 50. A pair of third transfer members 68''' is in this embodiment, shown as rigid links, with a fixed length. As previously disclosed, these third transfer members 68''' are coupled to the first lower link 46 and the second lower ling 50, each with a second end coupled to a transfer coupling 70. A pair of fourth transfer members 72 connects each of the two transfer couplings 70 to the second transfer system 56''''. In this embodiment the second transfer system 56'''' includes a second transfer bar 74'''' which includes a first ear 176 which is positioned substantially opposite to a second ear 178. This substantially opposite orientation of the first ear 176 relative to the second ear 178 enables substantially opposite displacement of one of the fourth transfer member 72 to the other fourth transfer member 72.

A similar system may be used in the first transfer system 54'''' in which a first transfer bar 62'''' may be provided with a first bar ear 180 positioned substantially opposite to a second bar ear 182. As with the second transfer system 56'''', the first transfer bar 62'''' of the first transfer system 54'''' provides substantially opposite displacement of the first transfer member 58 relative to the second transfer member 60, thereby enabling substantially reciprocating movement of the first upper link 44 relative to the second upper link 48. To assist and guide the user, a compression link 100 may be provided to limit the bottom movement of the foot support 52 under the foot of the user during the stance phase of the gait. As previously disclosed, the compression link 100 may include a spring or other bias member that provides a cushion to comply with the user's higher force during the middle of the stance phase of most gait patterns. In addition, the bias in the compression link 100 may assist with the recoil of the foot during the toe-off at the end of the stance phase and beginning of the swing phase of many running and walking gaits. As such the compression link 100 may be desired to use in this or other embodiments of the invention.

An alternative resistance source has been provided in the form of a hydraulic damper 184. This may be a one-way shock which provides resistance to compression thereby resisting the tendency of the first upper link 44 and the second upper link 48 to fall under the weight of the user. The recoil, or upward movement of the first upper link 44 and the second upper link 48 may not be restricted if the damper 184 offers little or no resistance to extension of the cylinder of the damper 184. Any form of resistance commonly known in the art may be used in any number of locations including the first transfer system 54'''', the second transfer system 56'''', the fourth transfer members 72 or in this case, the first transfer member 58 and the second transfer member 60 near the attachment with the first upper link 44 and the second upper link 48 respectively. A restriction to movement of any part of the system may result in restriction to movement of the foot supports 52 in that the foot supports 52 may be connected through the linkage systems as shown and described.

The foregoing detailed description of the present invention is provided for purposes of illustration, and it is not intended to be exhaustive or to limit the invention to the particular embodiment shown. The embodiments may provide different capabilities and benefits, depending on the configuration used to implement key features of the invention.

What is claimed is:

1. An exercise device, comprising:
   (a) a frame;
   (b) a first upper link and a second upper link, each pivotally coupled to the frame about a first axis;
   (c) a first lower link pivotally coupled to the first upper link at a location not collinear with the first axis, and a second lower link pivotally coupled to the second upper link at a location not collinear with the first axis, the first lower link and the second lower link each including a foot support;
   (d) a transfer system coupled to the frame and including a first bar coupled to the first upper link and a second bar coupled to the second upper link, whereby the first bar and the second bar can transfer both tensile and compressive forces, and the first and second bars provide synchronized out of phase pivoting of the first upper link relative to the second upper link; and
   (e) a first torque element coupled to the frame and the first lower link and a second torque element coupled to the frame and the second lower link, wherein the first torque element and the second torque element are operatively independent from one another, and whereby the first torque element and the second torque element operate to resist movement of the first lower link and the second lower link respectively.

2. The exercise device according to claim 1, wherein the first torque element and the second torque element are comprised of a pair of clutches.

3. The exercise device according to claim 1, wherein the first torque element and the second torque element are comprised of a pair of dampers offering a resistance to movement in one direction.

4. The exercise device according to claim 3, wherein the damper is a hydraulic damper.

5. The exercise device according to claim 1, further comprising an energy storage system coupled to the frame and adapted to transfer torque to the first lower link and the second lower link.

6. The exercise device according to claim 5, wherein the energy storage system is comprised of an electric motor driving a transfer bar, the transfer bar journaled to the frame.

7. The exercise device according to claim 6, wherein the transfer bar provides an input to a pair of clutches, the clutches adapted to regulate the torque from the motor to the first lower link and the second lower link.

8. The exercise device according to claim 5, wherein the energy storage system is comprised of a compression spring.

9. The exercise device according to claim 5, wherein the energy storage system is comprised of a first compression spring in mechanical communication with the first lower link and a second compression spring in mechanical communication with the second lower link.

10. The exercise device according to claim 1 wherein (a) the first upper link and the second upper link are pivotally coupled to the frame at a first end of the respective upper link, (b) the first lower link and the second lower link are each pivotally coupled at a first end to a second end of the respective upper link, and (c) the foot supports on the first and second lower links are positioned distal to the first end of the respective lower link.

* * * * *